US012498651B2

(12) United States Patent
Yamamoto et al.

(10) Patent No.: US 12,498,651 B2
(45) Date of Patent: Dec. 16, 2025

(54) DEVELOPER REPLENISHMENT CONTAINER WITH ANNULAR SEAL MEMBER

(71) Applicant: CANON KABUSHIKI KAISHA, Tokyo (JP)

(72) Inventors: Tatsuyuki Yamamoto, Tokyo (JP); Akihito Kamura, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 31 days.

(21) Appl. No.: 18/515,955

(22) Filed: Nov. 21, 2023

(65) Prior Publication Data

US 2024/0210855 A1 Jun. 27, 2024

(30) Foreign Application Priority Data

Dec. 22, 2022 (JP) ................................ 2022-205310
Dec. 26, 2022 (JP) ................................ 2022-208319

(51) Int. Cl.
*G03G 15/08* (2006.01)

(52) U.S. Cl.
CPC ....... *G03G 15/087* (2013.01); *G03G 15/0872* (2013.01); *G03G 15/0881* (2013.01);
(Continued)

(58) Field of Classification Search
CPC ........... G03G 15/0868; G03G 15/0872; G03G 15/087; G03G 2215/0663;
(Continued)

(56) References Cited

U.S. PATENT DOCUMENTS 6,298,208 B1 * 10/2001 Kawamura ........ G03G 15/0886 399/258
7,962,064 B2 * 6/2011 Asai .................. G03G 15/0863 399/262
(Continued)

FOREIGN PATENT DOCUMENTS

JP 2008298907 A 12/2008
JP 2011180348 A 9/2011
(Continued)

*Primary Examiner* — Robert B Beatty
(74) *Attorney, Agent, or Firm* — ROSSI, KIMMS & McDOWELL LLP

(57) ABSTRACT

A developer replenishment container configured to be detachably attachable to a developer replenishment device and replenish via the developer replenishment device is disclosed. The developer replenishment container including: a developer replenishment portion with a replenishment port; a developer accommodation portion having accommodate a developer; and an annular seal member for sealing a gap between the developer replenishment portion and the developer accommodation portion. The developer accommodation portion has an annular abutment portion provided at an end portion on a developer replenishment portion side in a direction of an axis which is a rotation center of the developer accommodation portion and provided to be in contact with the seal member in the direction of the axis; and a projecting portion provided near the abutment portion and provided to project toward the developer replenishment portion further than the abutment portion in the direction of the axis.

7 Claims, 25 Drawing Sheets

(52) U.S. Cl.
CPC ............... *G03G 2215/0663* (2013.01); *G03G 2215/0668* (2013.01); *G03G 2215/0685* (2013.01)

(58) Field of Classification Search
CPC ... G03G 2215/0668; G03G 2215/0685; G03G 15/0881
USPC .......................................................... 399/262
See application file for complete search history.

(56) References Cited

U.S. PATENT DOCUMENTS

| | | | | |
|---|---|---|---|---|
| 8,929,780 | B2 | 1/2015 | Yamabe et al. | |
| 9,395,649 | B1 | 7/2016 | Kanno et al. | |
| 9,588,461 | B2 | 3/2017 | Kamura et al. | |
| 10,809,649 | B2 * | 10/2020 | Fumoto | G03G 15/0898 |
| 11,048,191 | B2 * | 6/2021 | Fumoto | G03G 15/0872 |
| 11,687,027 | B2 | 6/2023 | Jimba et al. | |
| 2009/0279916 | A1 * | 11/2009 | Naito | G03G 15/0872 399/106 |
| 2011/0038647 | A1 * | 2/2011 | Kawamura | G03G 15/0881 399/106 |

FOREIGN PATENT DOCUMENTS

| | | | |
|---|---|---|---|
| JP | 2014199387 | A | 10/2014 |
| JP | 2016164636 | A | 9/2016 |
| JP | 2016170228 | A | 9/2016 |
| JP | 6021699 | B2 | 11/2016 |
| JP | 2022126887 | A | 8/2022 |
| JP | 2022171980 | A | 11/2022 |

* cited by examiner

A-A CROSS SECTIONAL VIEW

B-B CROSS SECTIONAL VIEW

DEVELOPER REPLENISHMENT CONTAINER WITH ANNULAR SEAL MEMBER

BACKGROUND OF THE INVENTION

Field of the Invention

The present invention relates to a developer replenishment container that is detachably attachable to an image forming apparatus.

Description of the Related Art

In the related art, a fine powder developer has been used in an electrophotographic image forming apparatus such as a copying machine. The image forming apparatus has a configuration in which, since a developer is consumed along with image formation, the developer is replenished from a developer replenishment container detachably attached.

As the developer replenishment container, a developer replenishment container configured to include a flange portion having a discharge port and a developer accommodation portion having an internal space that accommodates a developer, in which the developer accommodation portion relatively rotates with respect to the flange portion, thereby replenishing the developer from the discharge port has been disclosed (Japanese Patent No. 6,021,699).

In this developer replenishment container, the developer accommodation portion is attached to the flange portion to be relatively rotatable with respect to the flange portion in a state where a ring-shaped seal member provided on the flange portion is compressed at an end portion of the developer accommodation portion. Hence, the developer replenishment container of the related art has a configuration in which the end portion of the developer accommodation portion (abutment portion with the seal member) rubs against the seal member, so that the developer accommodation portion relatively rotates with respect to the flange portion while sealing is achieved between the developer accommodation portion and the flange portion.

In the developer replenishment container of the related art, the developer accommodation portion may be a target component to be collected and reused as a product used in the market from the viewpoint of global environment protection. In a case where the developer replenishment container is reused, there is a possibility that a component will be damaged in such a process.

SUMMARY OF THE INVENTION

According to a representative configuration of the present invention, there is provided a developer replenishment container configured to be detachably attachable to a developer replenishment device and replenish a developer through a replenishment port, the developer replenishment container including: a developer replenishment portion configured to have the replenishment port and be restricted not to rotate by being attached to the developer replenishment device; a developer accommodation portion configured to be provided to be relatively rotatable with respect to the developer replenishment portion and accommodate a developer; and an annular seal member configured to be provided at a connection portion between the developer replenishment portion and the developer accommodation portion and seal a gap between the developer replenishment portion and the developer accommodation portion. The developer accommodation portion has an annular abutment portion provided at an end portion on a developer replenishment portion side in a direction of an axis which is a rotation center of the developer accommodation portion and provided to be in contact with the seal member in the direction of the axis; and a projecting portion provided near the abutment portion and provided to project toward the developer replenishment portion further than the abutment portion in the direction of the axis.

Further features of the present invention will become apparent from the following description of exemplary embodiments with reference to the attached drawings.

DESCRIPTION OF THE EMBODIMENTS

Hereinafter, a developer replenishment container and a developer replenishment system according to the present invention will be specifically described. Note that in the following description, unless otherwise specified, various configurations of the developer replenishment container can be replaced with other known configurations having similar functions, within the scope of the idea of the invention. That is, unless otherwise specified, there is no intention to limit the various configurations only to configurations of the developer replenishment container described in Examples to be described below.

Example 1

First, a basic configuration of an image forming apparatus 1 will be described, and subsequently, configurations of four developer replenishment devices 3 and four developer replenishment containers 4 constituting a developer replenishment system 2 mounted on the image forming apparatus 1 will be sequentially described.

(Image Forming Apparatus)

Figure 1:
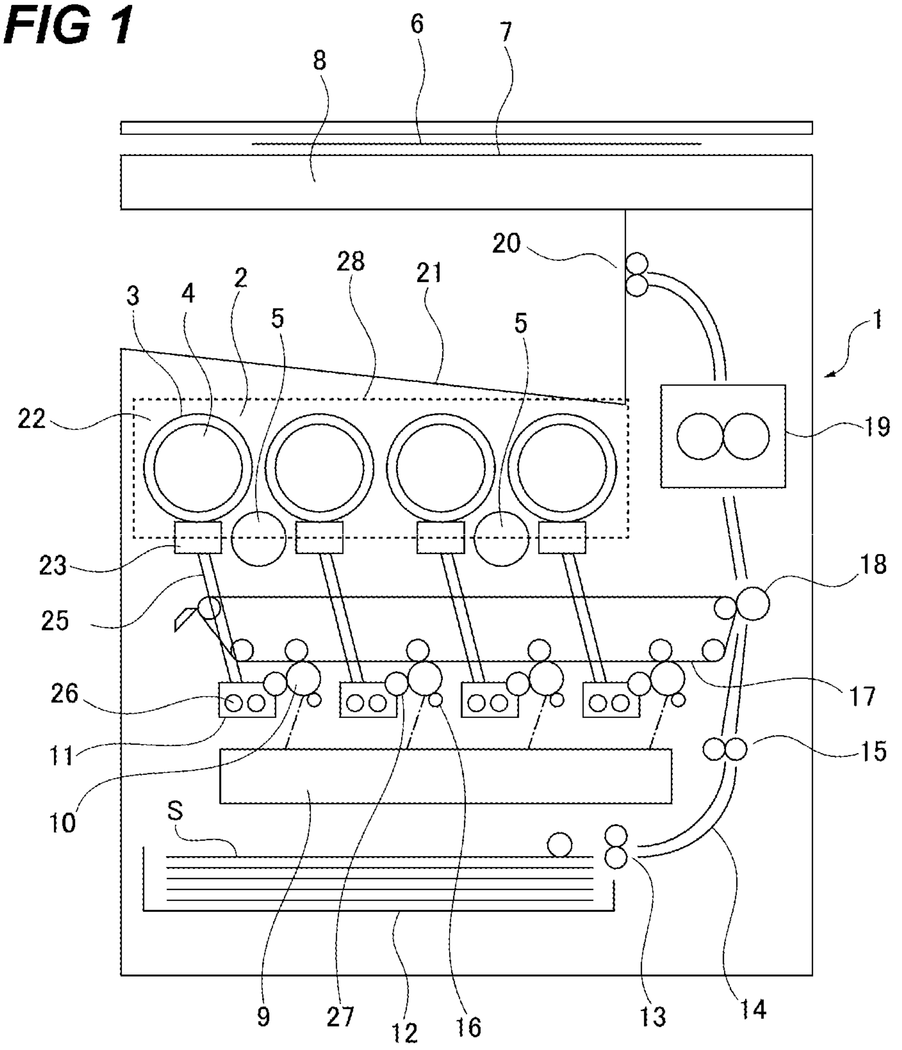
FIG. 1 is a schematic cross-sectional view illustrating a configuration of an image forming apparatus.

As an example of the image forming apparatus 1 on which the developer replenishment devices 3 to which the developer replenishment containers 4 are detachably (removably) attached is mounted, a configuration of a copying machine (electrophotographic image forming apparatus) employing an electrophotographic system will be described with reference to FIG. 1. FIG. 1 is a schematic cross-sectional view illustrating a configuration of the image forming apparatus 1.

In FIG. 1, the image forming apparatus 1 represents a copying machine body (hereinafter, referred to as an image forming apparatus or an apparatus body). In addition, an original 6 is placed on an original base plate glass 7. Then, image information of the original 6 placed on the original base plate glass 7 is read by a reading portion 8. Data of the original 6 obtained as the image information by the reading portion 8 is imaged on each photoreceptor 10 by a laser scanner 9. Consequently, an electrostatic latent image is formed on each photoreceptor 10. This electrostatic latent image is visualized using toner (mono-component magnetic toner) as a developer (dry powder) by a dry development device 11 (mono-component development device).

Note that in the present example, an example in which mono-component magnetic toners are used as developers that are to be replenished from the four developer replenishment containers 4 will be described, but not only the example but also a configuration as will be described below may be used.

Specifically, in the case of using the mono-component development device that performs development using mono-component non-magnetic toners, the mono-component non-magnetic toners are replenished as the developers. In addition, in a case of using a two-component development device that performs development using two-component developers obtained by mixing a magnetic carrier and a non-magnetic toner, the non-magnetic toners are replenished as the developers. In this case, the magnetic carrier may be replenished together with the non-magnetic toner as the developer.

A recording medium (hereinafter, also referred to as a "sheet") S is accommodated in a cassette 12 disposed in a lower portion of the image forming apparatus 1. Here, the recording medium is not limited to paper, and for example, an overhead projector (OHP) sheet or the like can be appropriately used and selected.

The sheets S accommodated in the cassette 12 are fed one by one by a feeding/separating device 13. Then, one sheet S conveyed by the feeding/separating device 13 is conveyed to a registration roller 15 via a conveying portion 14. The sheet S is conveyed by the registration roller 15 in synchronization with rotation of the photoreceptors 10 and a scanning timing of a laser scanner 9.

Each of the photoreceptors 10 is charged by respective chargers 16, and an electrostatic latent image is formed by scanning of the laser scanner 9 as described above. Then, the mono-component magnetic toner is supplied from the development device 11 to the electrostatic latent image formed on the photoreceptor 10, and a toner image is formed on the photoreceptor 10.

The toner image formed on each of the photoreceptors 10 is transferred to a transfer belt 17. This image forming process is repeated for four colors of yellow (Y), magenta (M), cyan (C), and black (K), and a four-color superimposed toner image is formed on the transfer belt 17.

The toner image formed on the transfer belt 17 is transferred to the sheet S at a nip (secondary transfer portion) of a transfer roller 18. The sheet S to which the toner image has been transferred is sent to a fixing portion 19, the toner image is fixed by heat and pressure in the fixing portion 19 and then discharged onto a discharge tray 21 from a discharge portion 20, and an image forming operation is completed.

(Developer Replenishment System)

Figure 2:
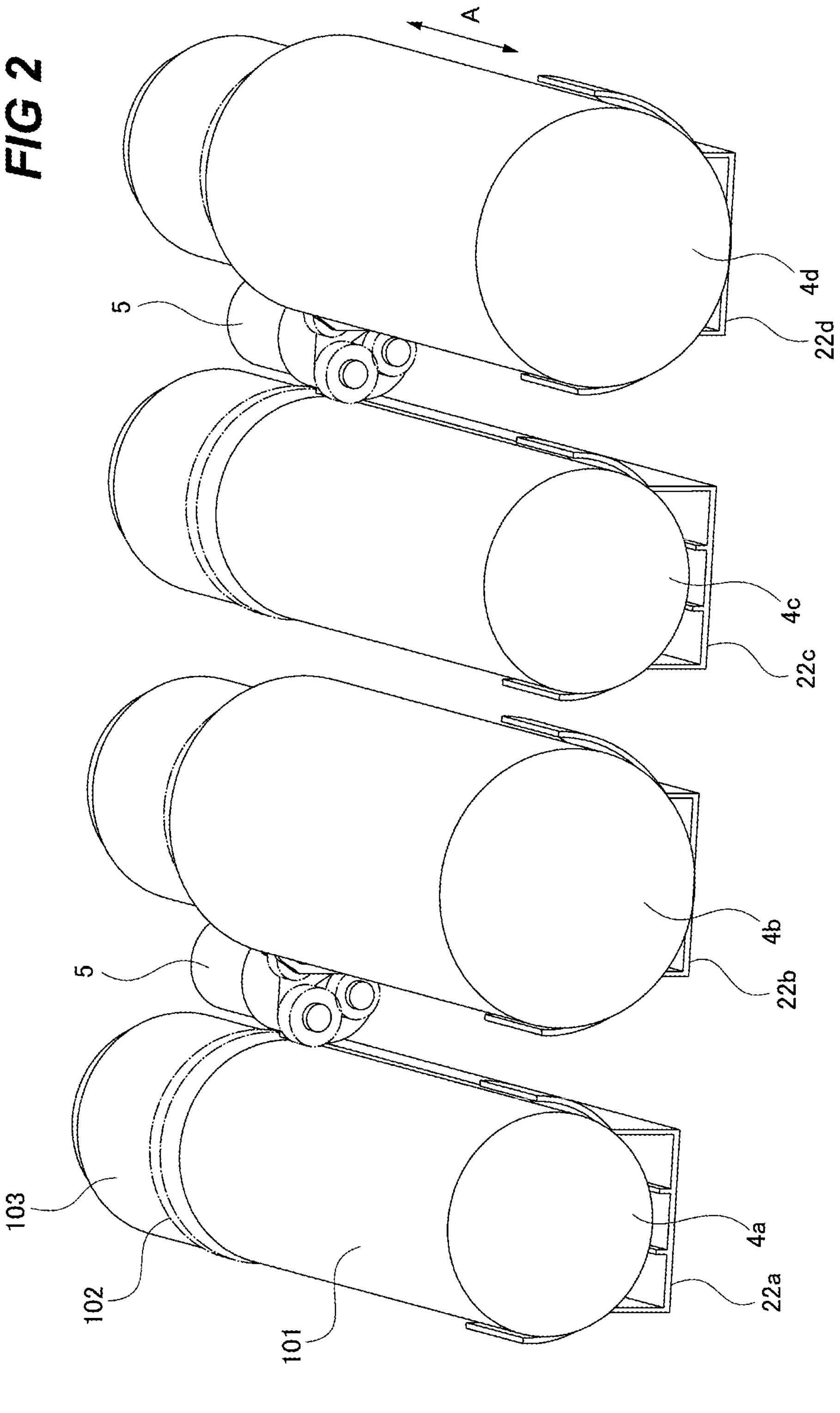
FIG. 2 is an external view of a developer replenishment device and a developer replenishment container.
Figure 3:
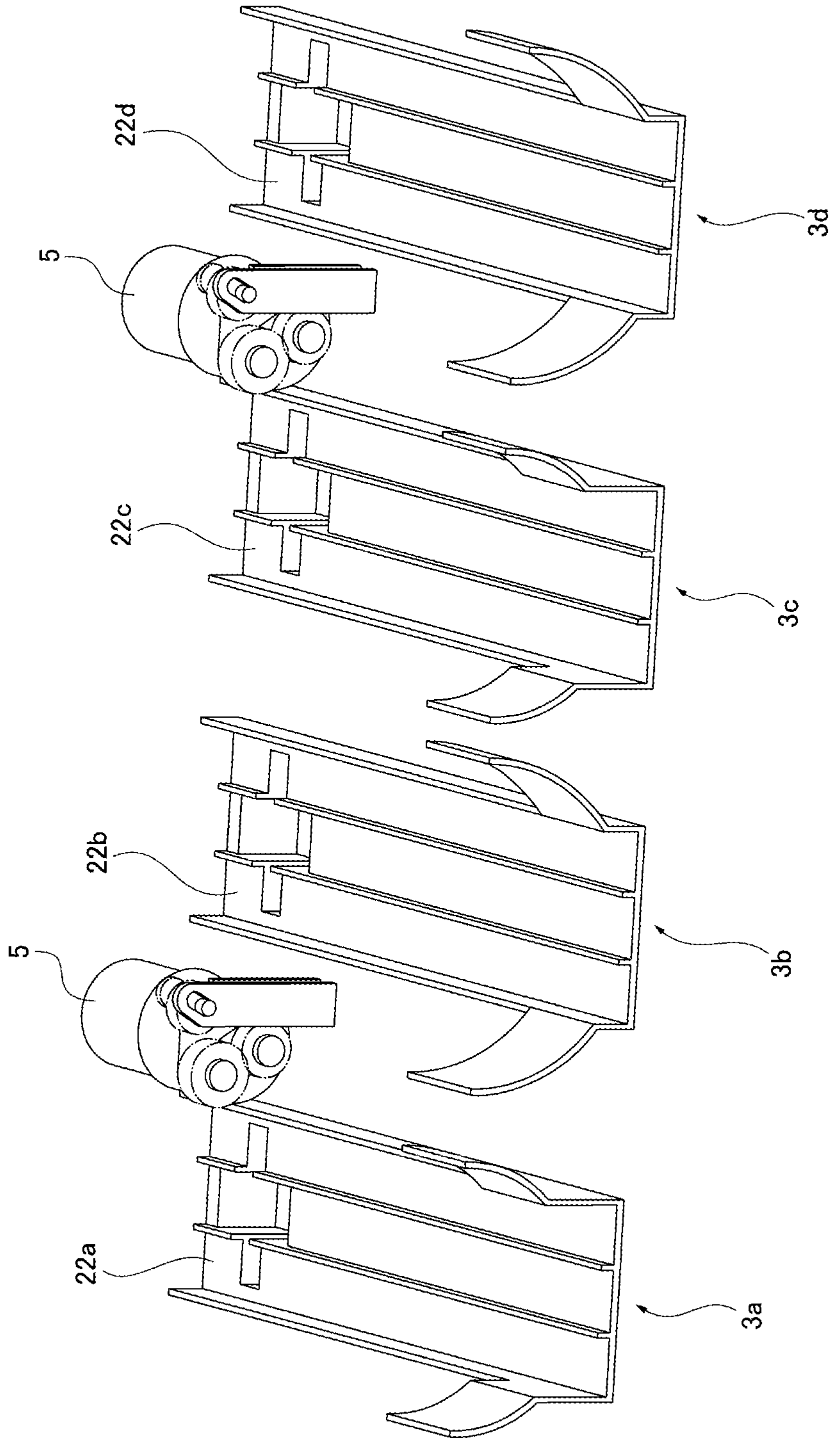
FIG. 3 is an external view of the developer replenishment device.

Next, four developer replenishment devices 3*a* to 3*d* and four developer replenishment containers 4*a* to 4*d*, which are configurational elements of the developer replenishment system 2, will be described with reference to FIGS. 1, 2, and 3. FIG. 2 is an external view of the developer replenishment device 3 and the developer replenishment container 4. FIG. 3 is an external view of the developer replenishment device 3.

Note that since the developer replenishment devices 3*a* to 3*d* and the developer replenishment containers 4*a* to 4*d* have a common configuration except that colors of toner used are different, hereinafter, a to d will be omitted. In addition, here, a configuration of the four developer replenishment devices 3*a* to 3*d* and the four developer replenishment containers 4*a* to 4*d* are exemplified as the configurational elements of the developer replenishment system 2; however, the number of developer replenishment devices used and the number of developer replenishment containers used should be appropriately set and are not limited thereto.

The developer replenishment device 3 includes an attachment portion 22 (attachment space) to which the developer replenishment container 4 is removably (detachably) attached, and a hopper 23 (see FIG. 1) that temporarily stores the developer discharged from the developer replenishment container 4. As illustrated in FIG. 2, the developer replenishment container 4 is configured to be attached to and detached from the attachment portion 22 in an A direction. That is, the developer replenishment container 4 is attached to and detached from the attachment portion 22 such that a longitudinal direction (rotational axis direction, that is, a direction of an axis P illustrated in FIG. 4) of the developer replenishment container 4 substantially coincides with the A direction.

In addition, as illustrated in FIGS. 2 and 3, the developer replenishment device 3 includes a driving mechanism 5 that drives the developer replenishment container 4. The driving mechanism 5 has a function of applying a rotational driving force to the developer replenishment container 4 set in the attachment portion 22. The operation of the driving mechanism 5 is configured to operate under control of a control device (CPU) (not illustrated).

Here, a configuration in which two developer replenishment containers 4 are rotatably driven by one driving mechanism 5 is described as an example, but the configuration of the developer replenishment device is not limited thereto. For example, in the configuration, the driving mechanism 5 may be provided for each developer replenishment container.

In addition, as illustrated in FIG. 3, the attachment portion 22 has a rotation direction restricting portion (not illustrated) for restricting the movement of a container frame 103 in a rotation direction (B direction illustrated in FIG. 4) by abutting on the container frame 103 of the developer replenishment container 4 when the developer replenishment container 4 is attached.

In addition, the attachment portion 22 has a developer receiving port (not illustrated) for communicating with a supply port 103*a* (see FIG. 7) of the developer replenishment container 4 to be described below and receiving the developer discharged from the developer replenishment container 4, when the developer replenishment container 4 is attached.

When the developer is required, the driving mechanism 5 transmits the rotational driving force to the developer replenishment container 4 attached to the attachment portion 22. When the rotational driving force is transmitted by the driving mechanism 5, the developer is discharged from the developer replenishment container 4 and supplied to the hopper 23 of the developer replenishment device 3.

The developer discharged from the developer replenishment container 4 and stored in the hopper 23 is conveyed to the development device 11 via a replenishment path 25.

The developer conveyed to the development device 11 is conveyed to a development roller 27 by an agitation conveyance member 26, and is supplied from the development roller 27 to the photoreceptor 10 as necessary at the time of image formation.

(Method for Attaching/Removing Developer Replenishment Container)

Next, a method for attaching/removing the developer replenishment container 4 will be sequentially described.

First, an operator opens a replacement cover (not illustrated) which is a part of an outer cover of the image forming apparatus 1 and inserts and attaches the developer replenishment container 4 into and to the attachment portion 22 of the developer replenishment device 3. Thereafter, when the operator closes the replacement cover, an attachment process is ended. Consequently, the developer replenishment container 4 is set in a state where the developer can be replenished to the developer replenishment device 3.

On the other hand, when the operator replaces the developer replenishment container 4, the operator performs a reversed operation of the operation at the time of attachment. For example, in a case where the developer in the developer replenishment container 4 is empty, the operator opens the replacement cover (not illustrated) and takes out the developer replenishment container 4 from the attachment portion 22 of the developer replenishment device 3. Then, a new developer replenishment container 4 prepared in advance is inserted into and attached to the attachment portion 22 of the developer replenishment device 3. Thereafter, when the operator closes the replacement cover, a replacement operation from removal to reattachment of the developer replenishment container 4 is completed. Consequently, the developer replenishment container 4 is set in a state where the developer can be replenished to the developer replenishment device 3.

(Replenishment Operation of Developer Replenishment Container)

Figure 4:
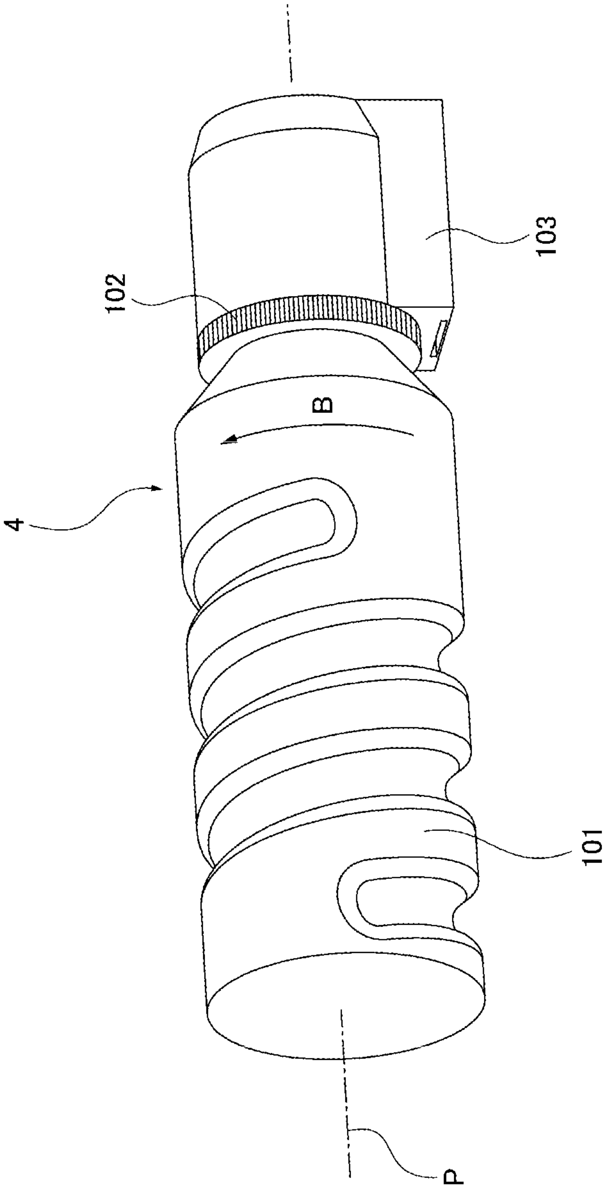
FIG. 4 is an external view of the developer replenishment container.
Figure 5:
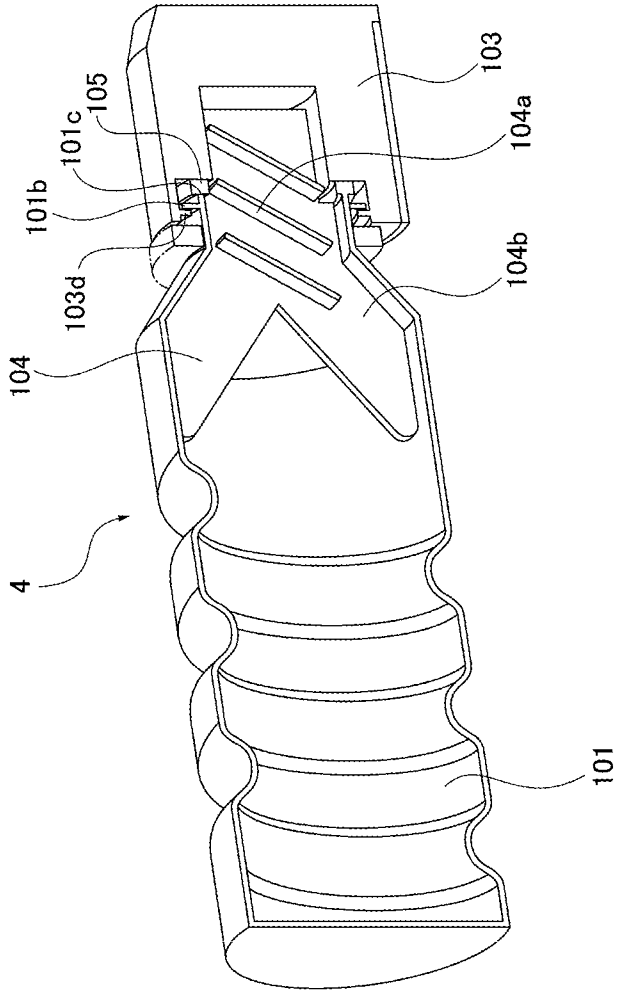
FIG. 5 is a cross-sectional view of the developer replenishment container.
Figure 6:
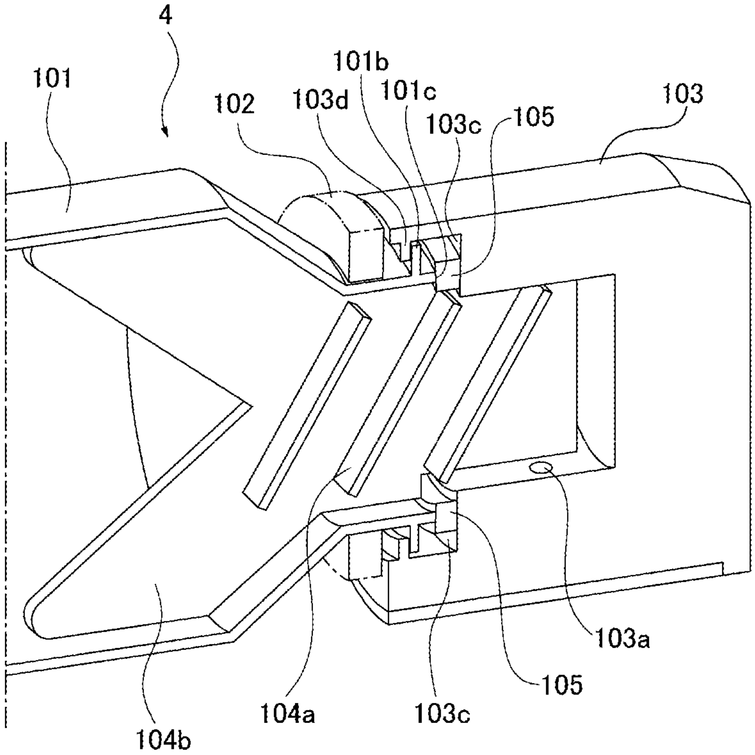
FIG. 6 is a cross-sectional view of the developer replenishment container on a container frame side.
Figure 7:
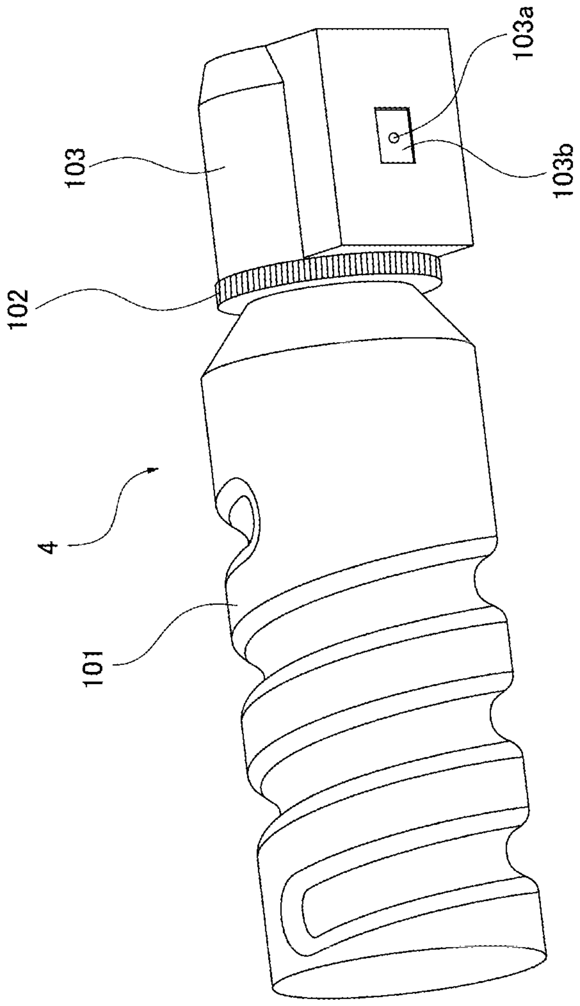
FIG. 7 is an external view of the developer replenishment container.
Figure 8A:
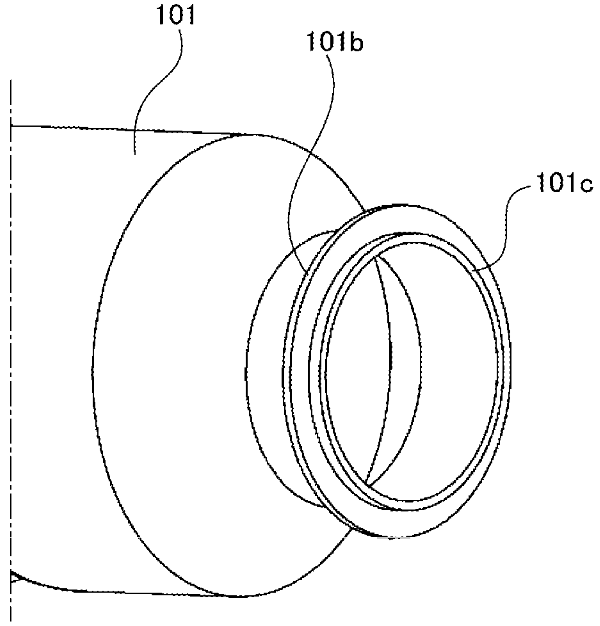
FIG. 8A is a perspective view of a distal end portion of a developer container.
Figure 8B:
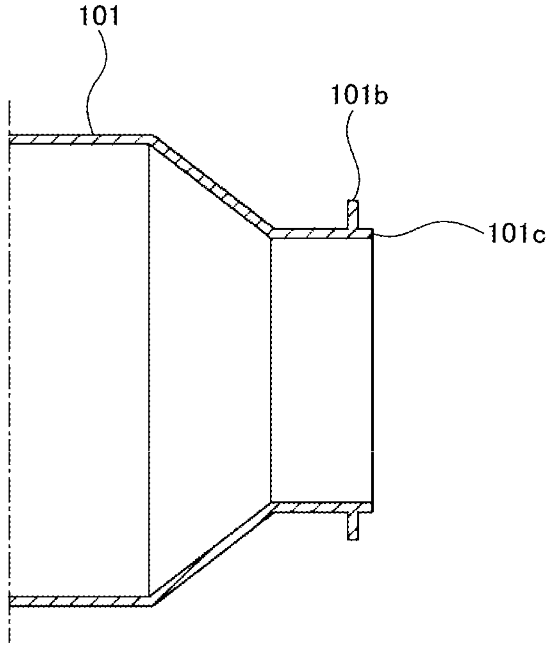
FIG. 8B is a cross-sectional view of the distal end portion of the developer container.

A replenishing operation of the developer replenishment containers 4*a* to 4*d* will be described with reference to FIGS. 4, 5, 6, 7, 8A, and 8B. FIG. 4 is an external view of the developer replenishment container. FIG. 5 is a cross-sectional view of the developer replenishment container. FIG. 6 is a cross-sectional view of the developer replenishment container on the container frame side. FIG. 7 is an external view of the developer replenishment container. FIG. 8A is a perspective view of a distal end portion of the developer container, and FIG. 8B is a cross-sectional view of the distal end portion of the developer container.

Note that the developer replenishment container 4*a* accommodates yellow (Y) toner, the developer replenishment container 4*b* accommodates magenta (M) toner, the developer replenishment container 4*c* accommodates cyan (C) toner, and the developer replenishment container 4*d* accommodates black (K) toner. Except for that, the developer replenishment containers 4*a* to 4*d* have a common configuration, and thus a to d will be omitted hereinafter.

The developer replenishment container 4 is configured to mainly include a developer container 101, a drive input gear 102, the container frame 103, a container blade 104, and a container seal 105. The developer replenishment container 4 is detachably attachable to the developer replenishment device 3 and replenishes the developer to the development device 11 through the developer replenishment device 3.

A drive input gear 102 and a container blade 104 are assembled to the developer container 101. The developer container 101 is configured to rotate integrally with the drive input gear 102 and the container blade 104.

The developer container 101 has a conveyance groove 101*a* formed in a spiral shape and is configured to rotate in the B direction around the axis P along with the rotation of the drive input gear 102 to which the rotational driving force is transmitted from the driving mechanism 5. The developer container 101 rotates in the B direction to convey the developer in the developer container 101 through the conveyance groove 101*a* toward the container frame 103.

The container blade 104 has a container blade conveying portion 104*a* and a container blade drawing portion 104*b* and rotates in the B direction along with the rotation of the drive input gear 102 similarly to the developer container 101. The developer conveyed through the conveyance groove 101*a* of the developer container 101 is drawn up from the developer container 101 by the container blade drawing portion 104*b* and is further conveyed toward the container frame 103. The developer drawn up by the container blade drawing portion 104*b* is conveyed into the container frame 103 by the container blade conveying portion 104*a* and is supplied to the supply port 103*a* to be described below.

The container frame 103 is mounted on the developer container 101 to be relatively rotatable. The container frame 103 is configured not to rotate in the B direction when rotation is input by the drive input gear 102 in a state in which the container frame is attached to the attachment portion 22 of the developer replenishment device 3.

Specifically, when the developer replenishment container 4 is attached to the developer replenishment device 3, the container frame 103 is restricted (inhibited) from rotating in the B direction by a rotation direction restricting portion (not illustrated) provided in the attachment portion 22. That is, the container frame 103 is held so as not to be rotatable in the B direction with respect to the attachment portion 22.

In addition, the container frame 103, which is a developer replenishment portion, has a supply port 103*a*, which is a replenishment port through which the developer sent from the developer container 101 is replenished into the developer replenishment device 3.

Note that although not illustrated, a container shutter (not illustrated) is assembled to the container frame 103. The container shutter includes a shutter opening communicable with the supply port 103*a*. The container shutter is provided to be movable in the direction of the axis P with respect to the developer replenishment container 4 and opens and closes the supply port 103*a* depending on an attachment/detachment operation of the developer replenishment container 4.

Specifically, the container shutter is provided to be movable to a sealing position at which the supply port 103*a* is sealed and a replenishment position at which the developer is replenished from the developer replenishment container 4 with the shutter opening facing the supply port 103*a*. That is, the container shutter is provided to be movable to the sealing position at which the supply port 103*a* is sealed and the replenishment position at which the shutter opening communicates with the supply port 103*a*.

(Sealing Configuration of Developer Replenishment Container)

The container frame 103 has the container seal 105, which is an annular seal member for sealing a gap between the container frame 103 and the developer container 101, at a connection portion with the developer container 101. Hereinafter, a sealing configuration of the connection portion between the developer container 101 and the container frame 103 will be described.

The developer container 101 has a container engagement rib 101*b* at the connection portion with the container frame 103. The container engagement rib 101*b* is provided at an outer circumferential surface of the connection portion of the developer container 101 with the container frame 103, is provided to project outward, and is provided to continuous all along a circumference in a circumferential direction.

The container frame 103 has a frame engagement rib 103*d* that engages with the container engagement rib 101*b* at the connection portion with the developer container 101. The frame engagement rib 103*d* is provided at an inner circumferential surface of the connection portion of the container frame 103 with the developer container 101, is provided to project inward, and is provided in the circumferential direction.

When the container engagement rib 101*b* of the developer container 101 and the frame engagement rib 103*d* of the container frame 103 engage with each other, the developer container 101 and the container frame 103 are held so as not to be separated from each other. In addition, the developer container 101 is held to be relatively rotatable around the axis P serving as a rotation center with respect to the container frame 103 by the engagement.

The container frame 103 has a seal bearing surface 103*c*. The seal bearing surface 103*c* is provided at a position facing the frame engagement rib 103*d* with a space therebetween in the direction of the axis P. The seal bearing surface 103*c* is provided to face an engagement surface (abutment surface) of the frame engagement rib 103*d* with the container engagement rib 101*b* in the direction of the axis P. The seal bearing surface 103*c* is provided to be continuous all along a circumference in the circumferential direction.

The container seal 105 adheres to the seal bearing surface 103*c* of the container frame 103. As described above, the container seal 105 is an annular seal member for sealing a gap between the container frame 103 and the developer container 101.

The developer container 101 has a container lip portion 101*c* which is an annular abutment portion at an end portion thereof. The container lip portion 101*c* is provided at an end portion on the container frame 103 side which is the developer replenishment portion side in the direction of the axis P. The container lip portion 101*c* is provided to project toward the container frame 103 side further than the container engagement rib 101*b* in the direction of the axis P to be in contact with the container seal 105 in the direction of the axis P. The container lip portion 101*c* is provided to be continuous all along the circumference in the circumferential direction. When the container engagement rib 101*b* and the frame engagement rib 103*d* engage with each other, the container lip portion 101*c* is configured to face the seal bearing surface 103*c* of the container frame 103 in the direction of the axis P and be in contact with the container seal 105 adhering to the seal bearing surface 103*c*. The container lip portion 101*c* is configured to rub against the container seal 105 when the developer container 101 rotates relatively with respect to the container frame 103.

As described above, the developer container 101 and the container frame 103 engage with the container engagement rib 101*b* and the frame engagement rib 103*d* and abut on the container seal 105 on the seal bearing surface 103*c* and the container lip portion 101*c*. Consequently, the developer container 101 and the container frame 103 are configured to be sealed even when the developer container 101 rotates with respect to the container frame 103.

(Reuse of Developer Container 101)

After the developer replenishment container 4 is used in the market, the developer replenishment container 4 can be reused by collecting the used developer replenishment container 4 and being refilled with the developer.

When the developer container 101 is reused, the developer container is produced as a product again through processes of disassembling the collected developer replenishment container 4, cleaning, moving, and storing the developer container 101, and assembling the developer replenishment container 4 using the reused developer container 101.

However, in order to reuse the developer replenishment container, before the used developer replenishment container is collected and is refilled with the developer, man-hours such as disassembly and cleaning are increased as compared with manufacturing of a new developer replenishment container. In particular, in the case of reusing the developer replenishment container, there is a possibility that a risk of breakage of a component will increase since the number of processes increases as compared with the case of a new product.

In the developer container 101, many portions are components having a relatively low risk of breakage; however, the container lip portion 101*c* which is an abutment portion with the container seal 105 is positioned at an end portion of the developer container 101. Therefore, when the developer container 101 is handled as a single component in assembly work or the like, there is a concern that the container lip portion 101*c* of the developer container 101 may be damaged by collision or the like in the work.

In a case where a scratch or the like is made in the container lip portion 101*c* which is the end portion of the developer container 101, there is a concern that a scratch or the like may also be made in the container seal 105 against which the container lip portion 101*c* rubs. As a result, in the developer replenishment container as a product, the sealability between the developer container 101 and the container frame 103 is reduced, and there is a concern that the developer may be scattered.

Therefore, in the reuse of the developer container 101, it is very important to reduce the risk of damage due to the collision of the container lip portion 101*c* serving as the abutment portion with the container seal 105.

(Protective Configuration 1 of Container Lip Portion)

Figure 9A:
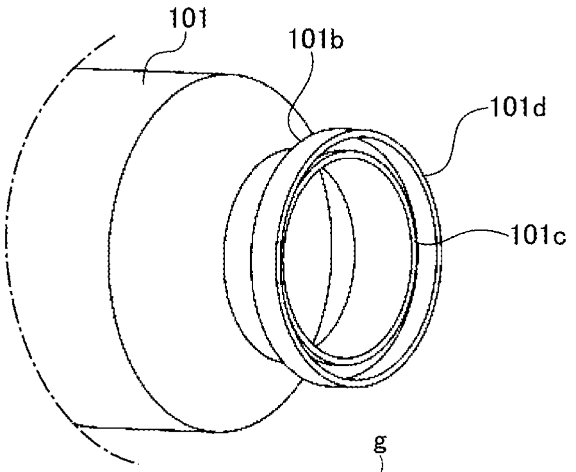
FIG. 9A is a perspective view of a distal end portion of a developer container according to Example 1.

A protective configuration of the container lip portion 101*c* of the developer container 101 according to Example 1 will be described with reference to FIGS. 9A to 9C. FIG. 9A is a perspective view of a distal end portion of the developer container 101 according to Example 1, FIG. 9B is a cross-sectional view of the distal end portion of the developer container 101, and FIG. 9C is a cross-sectional view of the developer replenishment container 4 on the container frame 103 side.

Figure 9B:
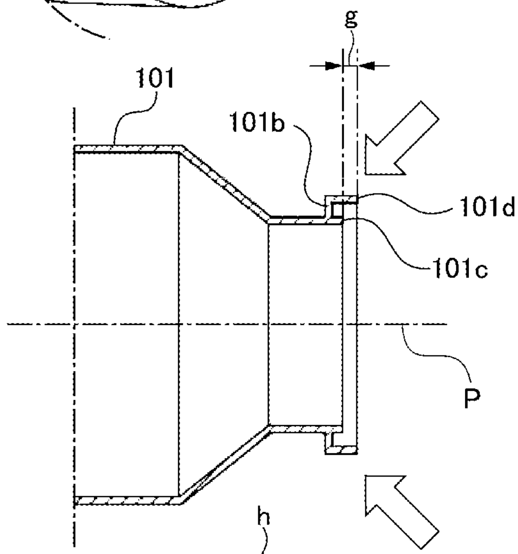
FIG. 9B is a cross-sectional view of the distal end portion of the developer container.
Figure 9C:
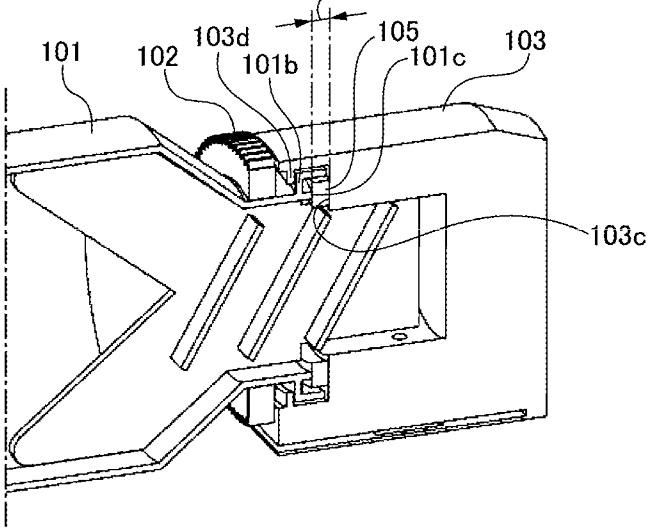
FIG. 9C is a cross-sectional view of a developer replenishment container on a container frame side.

As illustrated in FIGS. 9A to 9C, the developer replenishment container 4 according to Example 1 includes an outer projecting ring 101*d* which is a projecting portion provided to further project toward the container frame 103 side which is the developer replenishment portion side than the container lip portion 101*c* in the direction of the axis P.

The outer projecting ring 101*d* is provided in the vicinity of the container lip portion 101*c*. Specifically, the outer projecting ring 101*d* is provided on an outer circumferential side of the container lip portion 101*c*. The outer projecting ring 101*d* is provided to be continuous all along the circumference of the container lip portion 101*c* in the circumferential direction. The outer projecting ring 101*d* is annularly provided in the circumferential direction along the container lip portion 101*c*.

Therefore, as indicated by the arrows in FIG. 9B, the risk of damage to the container lip portion 101*c* can be effectively reduced particularly against collision with a disassembling device, a cleaning device, a moving device, a storage device, and an assembling device from the outer circumferential side. That is, it is possible to reduce the risk of making scratches or the like due to collision on the container lip portion 101*c* of the developer container 101 (the abutment portion with the container seal 105).

Example 2

A developer replenishment container according to Example 2 will be described with reference to FIGS. 10A to 10C. Since the configuration of the image forming apparatus 1 including the developer replenishment device 3 is similar to that of Example 1 described above, the description thereof will be omitted here. In addition, regarding the configuration of the developer replenishment container, the configuration is similar to that of Example 1 described above except for a configuration to be described below. Hence, the same reference numerals are assigned to members having the same functions, and the description thereof will be omitted.

Note that in Example 1 described above, the outer projecting ring 101*d* provided to continuous all along the circumference of the container lip portion 101*c* in the circumferential direction is exemplified as the projecting portion of the developer container 101, but the outer projecting ring is not limited thereto. Hereinafter, a specific description will be provided.

(Protective Configuration 2 of Container Lip Portion)

A protective configuration of the container lip portion 101*c* of the developer container 101 according to Example 2 will be described with reference to FIGS. 10A to 10C. FIG. 10A is a perspective view of a distal end portion of the developer container 101 according to Example 2, FIG. 10B is a cross-sectional view of the distal end portion of the developer container 101, and FIG. 10C is a cross-sectional view of the developer replenishment container 4 on the container frame 103 side.

Figure 10A:
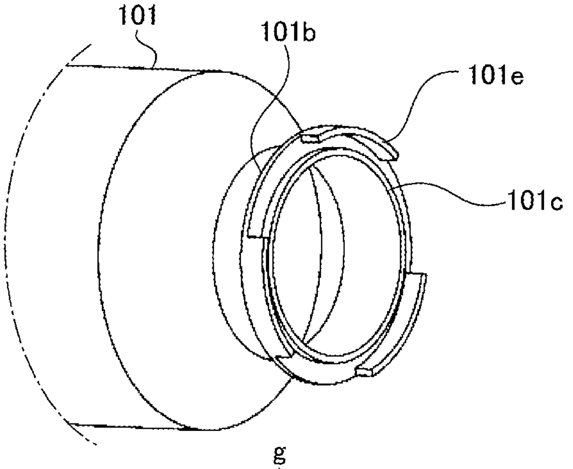
FIG. 10A is a perspective view of a distal end portion of a developer container according to Example 2.
Figure 10B:
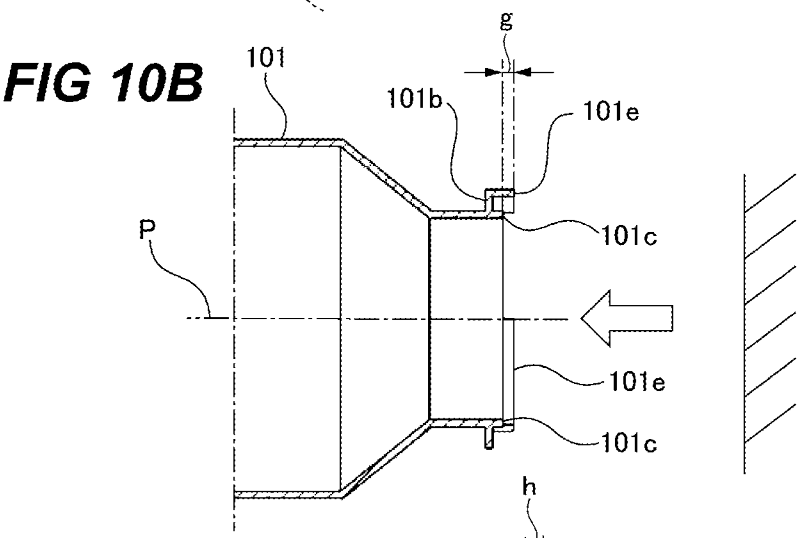
FIG. 10B is a cross-sectional view of the distal end portion of the developer container.
Figure 10C:
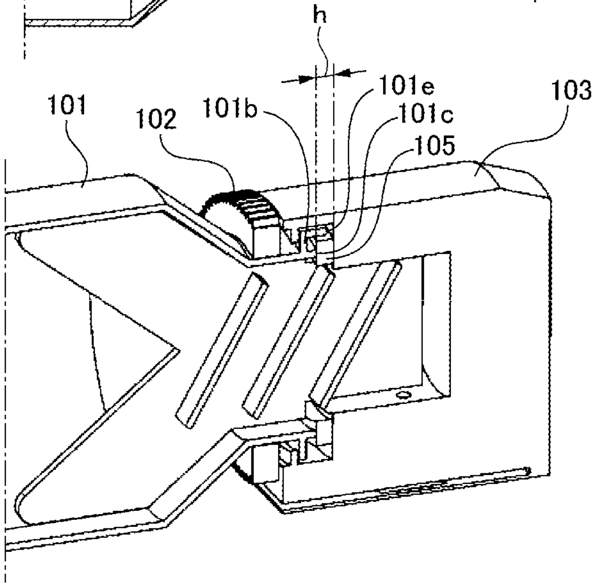
FIG. 10C is a cross-sectional view of a developer replenishment container on a container frame side.

As illustrated in FIGS. 10A to 10C, the developer replenishment container 4 according to Example 2 includes a projecting rib 101*e* which is a projecting portion provided to further project toward the container frame 103 side which is the developer replenishment portion side than the container lip portion 101*c* in the direction of the axis P.

The projecting rib 101*e* is provided in the vicinity of the container lip portion 101*c*. Specifically, the projecting rib 101*e* is provided on the outer circumferential side of the container lip portion 101*c*. The projecting rib 101*e* is provided to be divided into a plurality of portions in the circumferential direction of the container lip portion 101*c*. Here, the projecting ribs 101*e* are regularly provided at intervals of 120 degrees. In addition, the projecting ribs 101*e* are provided in a region of about 50% with respect to the entire outer circumference.

In other words, the projecting ribs 101*e* are provided to be divided into three portions at equal intervals in the circumferential direction of the container lip portion 101*c*. The outer projecting ring 101*d* is annularly provided in the circumferential direction along the container lip portion 101*c*.

Therefore, as indicated by the arrow in FIG. 10B, the risk of breakage of the container lip portion 101*c* can be effectively reduced particularly due to collision with a wall or a storage device having a surface.

Note that regarding a ratio of the region where the projecting ribs 101*e* are provided, even a very small region with respect to the outer circumference (for example, from about several percents of less than 50% with respect to the outer circumference) has an effect on collision with the wall or the storage device having a surface. However, in a case where the risk of damage to the projecting rib 101*e* itself is considered, a stress concentration at the time of collision can be avoided when the projecting ribs are provided in a certain region (for example, about 30% with respect to the outer circumference), so that the risk of damage can be further reduced.

On the other hand, as the number of regions where the projecting ribs 101*e* are provided is smaller, the amount of material to be added is also reduced, and thus this configuration is advantageous from the viewpoint of costs and the like.

In addition, regarding the number of the projecting ribs 101*e* in the circumferential direction, when the number is three or more, the projecting ribs stably come into contact with the surface, so that the possibility of breakage of the container lip portion 101*c* can be effectively reduced. However, even when the number of projecting ribs 101*e* in the circumferential direction is one or two, the possibility of breakage of the container lip portion 101*c* can be reduced.

In addition, also in the projecting rib 101*e*, it is possible to reduce the risk of breakage of the container lip portion 101*c* against collision with the disassembling device, the cleaning device, the moving device, the storage device, and the assembling device from the outer circumferential side.

Example 3

A developer replenishment container according to Example 3 will be described with reference to FIGS. 11A to 11C. Since the configuration of the image forming apparatus 1 including the developer replenishment device 3 is similar to that of Example 1 described above, the description thereof will be omitted here. In addition, regarding the configuration of the developer replenishment container, the configuration is similar to that of Example 1 described above except for a configuration to be described below. Hence, the same reference numerals are assigned to members having the same functions, and the description thereof will be omitted.

Note that in Example 1 described above, the outer projecting ring 101*d* provided to continuous all along the circumference of the container lip portion 101*c* in the circumferential direction is exemplified as the projecting portion of the developer container 101, but the outer projecting ring is not limited thereto. Hereinafter, a specific description will be provided.

(Protective Configuration 3 of Container Lip Portion)

A protective configuration of the container lip portion 101*c* of the developer container 101 according to Example 3 will be described with reference to FIGS. 11A to 11C. FIG. 11A is a perspective view of a distal end portion of the developer container 101 according to Example 3, FIG. 11B is a cross-sectional view of the distal end portion of the developer container 101, and FIG. 11C is a cross-sectional view of the developer replenishment container 4 on the container frame 103 side.

Figure 11A:
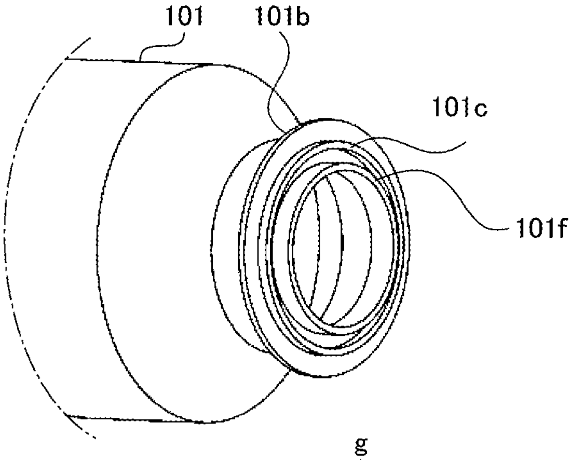
FIG. 11A is a perspective view of a distal end portion of a developer container according to Example 3.
Figure 11B:
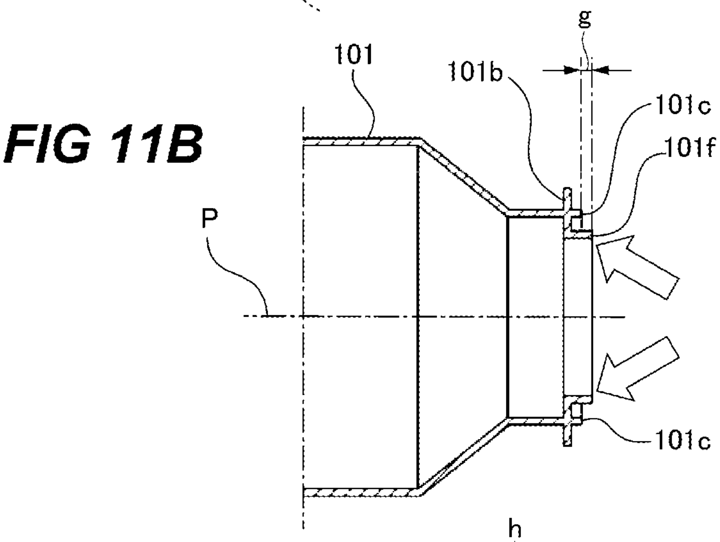
FIG. 11B is a cross-sectional view of the distal end portion of the developer container.
Figure 11C:
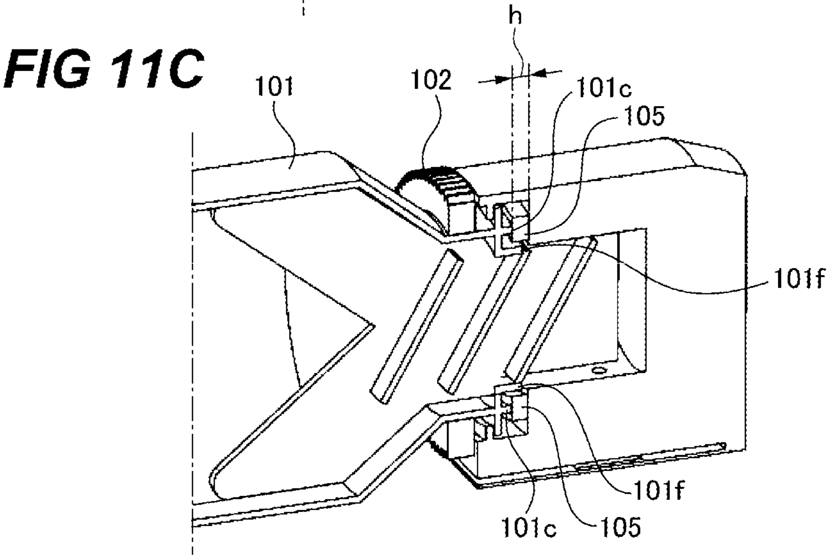
FIG. 11C is a cross-sectional view of a developer replenishment container on a container frame side.

As illustrated in FIGS. 11A to 11C, the developer replenishment container 4 according to Example 3 includes an inner projecting ring 101*f* which is a projecting portion provided to further project toward the container frame 103 side which is the developer replenishment portion side than the container lip portion 101*c* in the direction of the axis P.

The inner projecting ring 101*f* is provided in the vicinity of the container lip portion 101*c*. Specifically, the inner projecting ring 101*f* is provided on an inner circumferential side of the container lip portion 101*c*. The inner projecting ring 101*f* is provided to be continuous all along the circumference of the container lip portion 101*c* in the circumferential direction. The inner projecting ring 101*f* is annularly provided in the circumferential direction along the container lip portion 101*c*.

Therefore, as indicated by the arrows in FIG. 11B, the risk of damage to the container lip portion 101*c* can be effectively reduced particularly against collision with a disassembling device, a cleaning device, a moving device, a storage device, and an assembling device from an inner circumferential side. In particular, when the cleaning device enters an inside of the developer container 101 at the time of cleaning the developer inside the developer container 101, the risk of breakage of the container lip portion 101*c* can be effectively reduced.

Example 4

A developer replenishment container according to Example 4 will be described. First, a basic configuration of an image forming apparatus will be described, and subsequently, configurations of a developer replenishment system mounted on the image forming apparatus, that is, a developer replenishment device and a developer replenishment container will be described in this order.

(Image Forming Apparatus)

As an example of the image forming apparatus on which the developer replenishment device to which the developer replenishment container (so-called toner cartridge) is detachably (removably) attached is mounted, a configuration of a copying machine (electrophotographic image forming apparatus) employing an electrophotographic system will be described with reference to FIG. 12.

Figure 12:
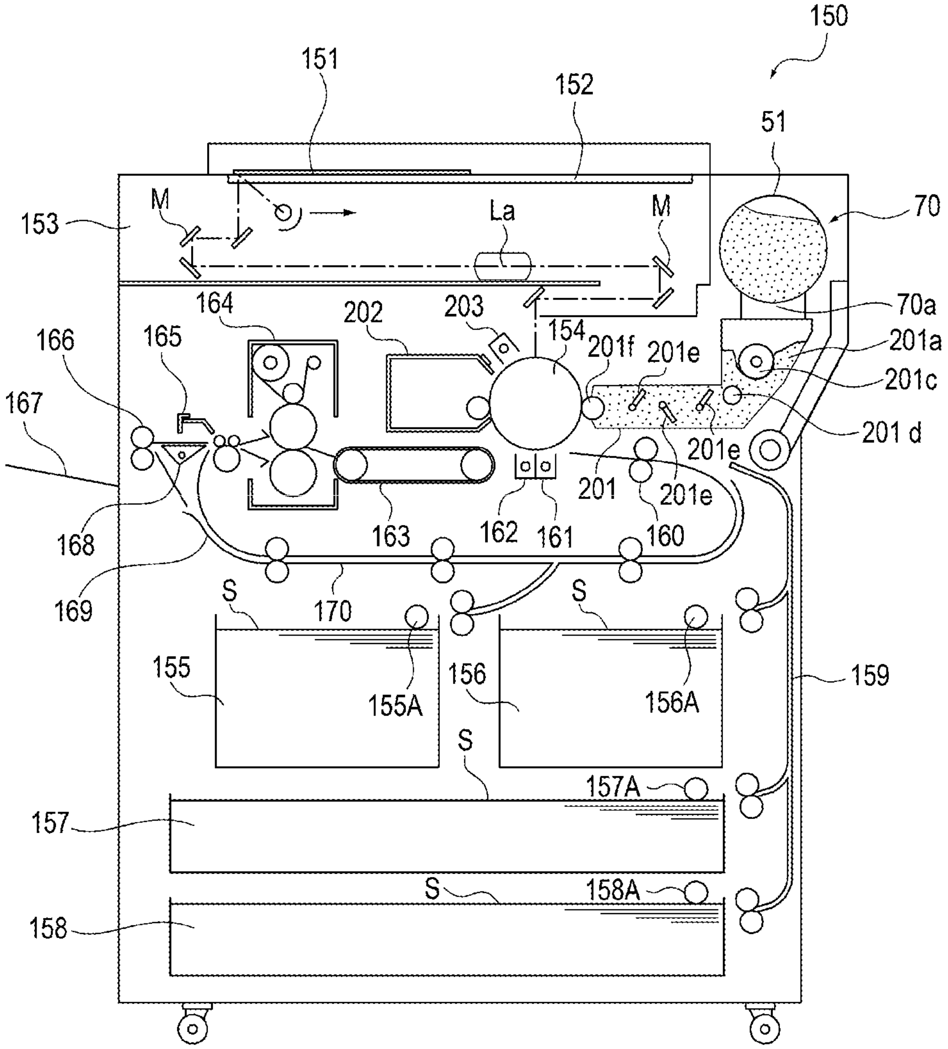
FIG. 12 is a cross-sectional view illustrating an overall configuration of the image forming apparatus.

In FIG. 12, a copying machine body 150 is a copying machine body (hereinafter, referred to as an image forming apparatus body or an apparatus body). In addition, an original 151 is placed on an original base plate glass 152. Then, an electrostatic latent image is formed by forming an optical image corresponding to image information of an original on an electrophotographic photoreceptor 154 (hereinafter, the photoreceptor) by a plurality of mirrors M and a lens Ln of an optical portion 153. This electrostatic latent image is visualized using toner (mono-component magnetic toner) as a developer (dry powder) by a dry development device (mono-component development device) 201*a*.

Cassettes 155 to 158 accommodate recording mediums (hereinafter, also referred to as "sheets") S. Of the sheets S stacked in these cassettes 155 to 158, an optimum cassette is selected based on information input by an operator (user) from a liquid crystal operation portion of the copying machine or a sheet size of the original 151. Here, the recording medium is not limited to paper, and for example, an overhead projector (OHP) sheet or the like can be appropriately used and selected.

Then, one sheet S conveyed by feeding/separating devices 155A to 158A is conveyed to a registration roller 160 through a conveyance portion 159 and is conveyed in synchronization with rotation of the photoreceptor 154 and a scanning timing of the optical portion 153.

A transfer charger 161 is provided, and a separating charger 162 is provided. Here, an image made of the developer which is formed on the photoreceptor 154 is transferred to the sheet S by the transfer charger 161. Then, the separating charger 162 separates the sheet S to which the developer image (toner image) has been transferred from the photoreceptor 154.

Then, after the developer image is fixed on the sheet by heat and pressure in a fixing portion 164, the sheet S conveyed by a conveyance portion 163 passes through a discharge reverse portion 165 and is discharged to a discharge tray 167 by a discharge roller 166 in a case of single-sided copy.

In addition, in a case of duplex copy, the sheet S passes through the discharge reverse portion 165, and a part of the sheet S is once discharged to the outside of the apparatus by the discharge roller 166. Then, an end of the sheet S passes through a flapper 168 and is conveyed into the apparatus again when the flapper 168 is controlled and the discharge rollers 166 is reversely rotated at a timing when the sheet S is still nipped by the discharge rollers 166. Further, thereafter, the sheet is conveyed to the registration roller 160 through re-feeding/conveying portions 169 and 170 and then is discharged to the discharge tray 167 through the same path as in the case of single-sided copy.

In the apparatus body 150 having the above-described configuration, image-formation processing devices such as the development device 201*a* as a development portion, a cleaner portion 202 as a cleaning portion, and a primary charger 203 as a charging portion are installed around the photoreceptor 154. Note that the development device 201*a* performs development by attaching a developer to an electrostatic latent image formed on the photoreceptor 154 by the optical portion 153, based on the image information of the original 151. In addition, the primary charger 203 is provided to uniformly charge a surface of the photoreceptor in order to form a desired electrostatic image on the photoreceptor 154. In addition, the cleaner portion 202 is provided to remove the developer remaining on the photoreceptor 154.

(Developer Replenishment Device)

Figure 13A:
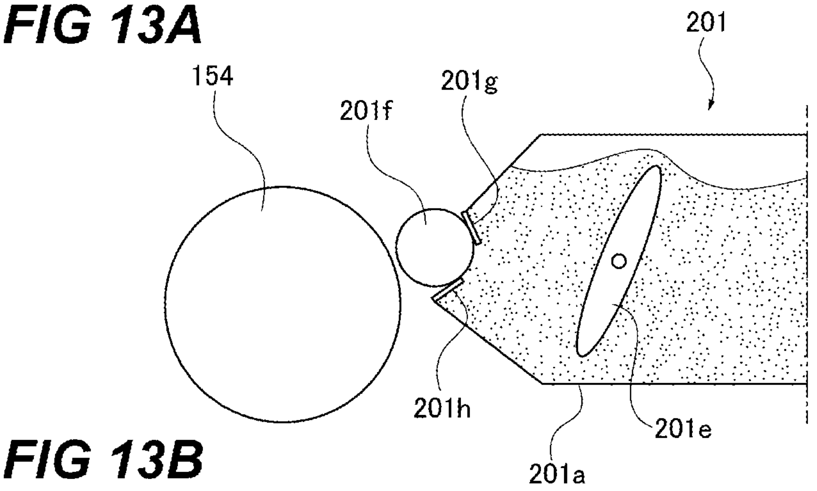
FIG. 13A is a partial cross-sectional view of a developer replenishment device.
Figure 13B:
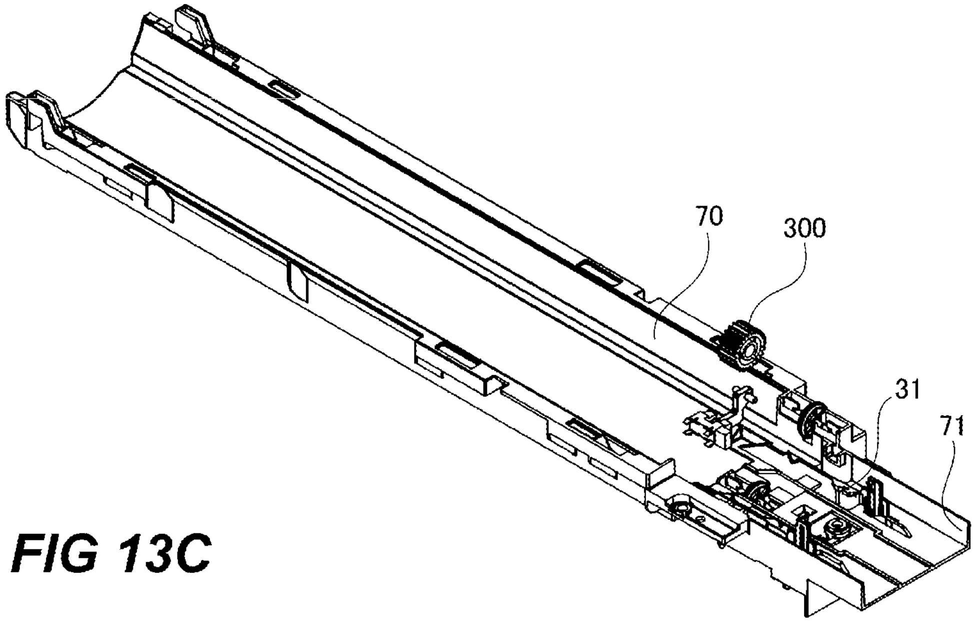
FIG. 13B is a perspective view of an attachment portion.
Figure 13C:
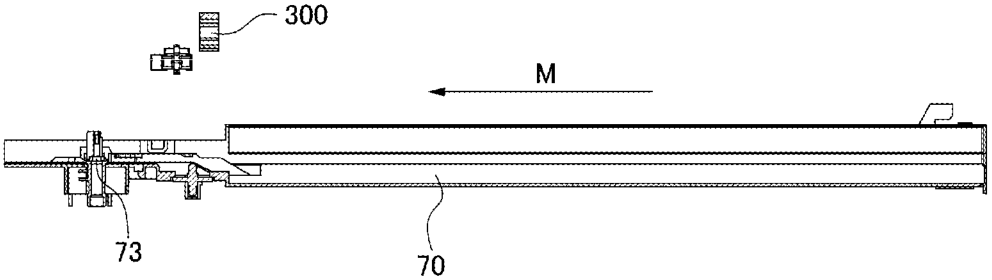
FIG. 13C is a cross-sectional view of the attachment portion.
Figure 14:
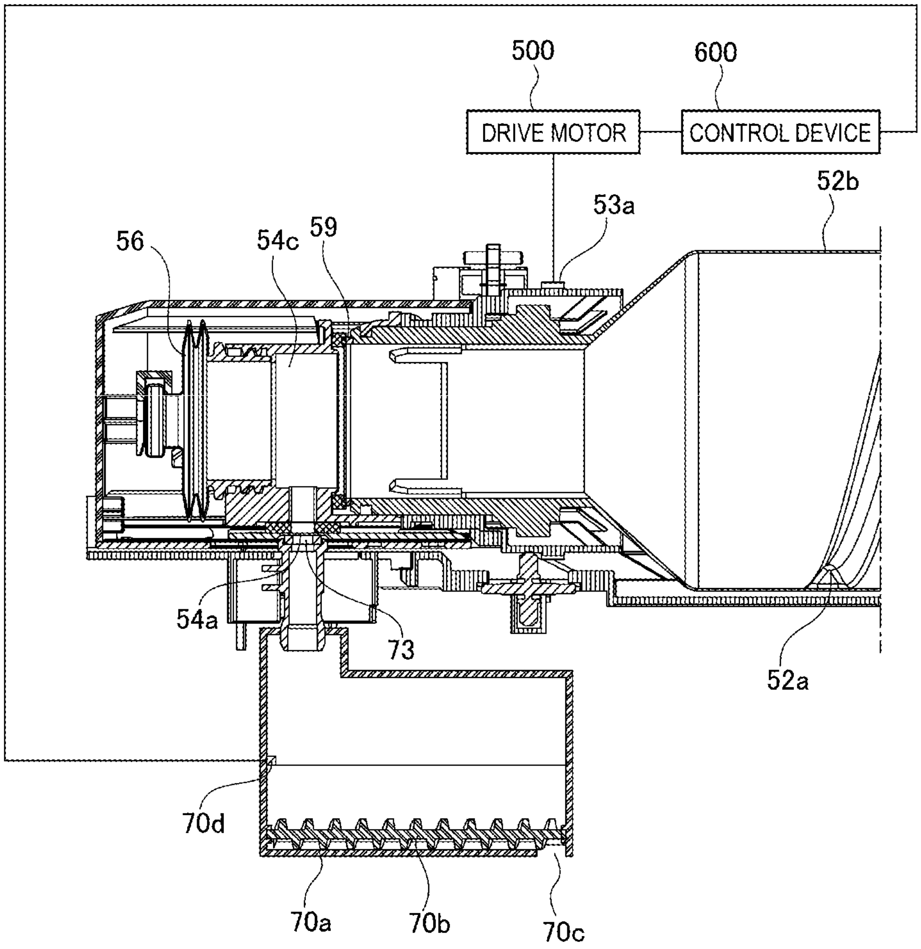
FIG. 14 is a partially enlarged cross-sectional view illustrating the developer replenishment container and the developer replenishment device.
Figure 15:
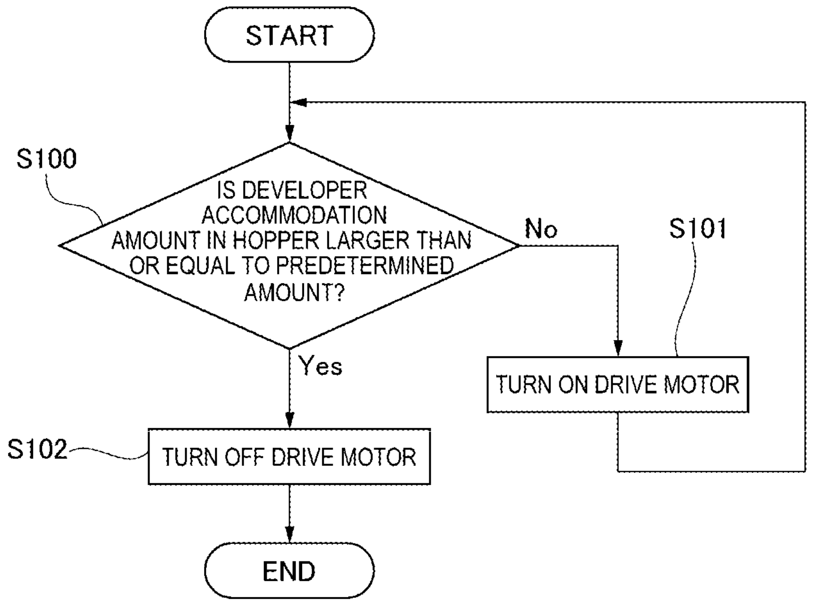
FIG. 15 is a flowchart illustrating a flow of developer replenishment.

Next, a developer replenishment device 201, which is a configurational element of the developer replenishment system, will be described with reference to FIGS. 12 to 15. Here, FIG. 13A is a partial cross-sectional view of the developer replenishment device 201, FIG. 13B is a perspective view of an attachment portion 70 to which the developer replenishment container 51 is attached, and FIG. 13C is a cross-sectional view of the attachment portion 70. In addition, FIG. 14 is a partially enlarged cross-sectional view of a control system, the developer replenishment container 51, and the developer replenishment device 201. FIG. 15 is a flowchart illustrating a flow of developer replenishment by the control system.

As illustrated in FIG. 12, the developer replenishment device 201 includes the attachment portion (attachment space) 70 to which the developer replenishment container 51 is removably (detachably) attached, a hopper 70*a* that temporarily stores a developer T discharged from the developer replenishment container 51, and a development device 201*a*. As illustrated in FIG. 13C, the developer replenishment container 51 is configured to be attached to the attachment portion 70 in an M direction. That is, the developer replenishment container 51 is attached to the attachment portion 70 such that a longitudinal direction (rotational axis direction) of the developer replenishment container substantially coincides with the M direction. Note that the M direction is substantially parallel to an X direction in FIGS. 18A and 18B to be described below. In addition, a direction in which the developer replenishment container 51 is removed from the attachment portion 70 is a direction opposite to the M direction.

As illustrated in FIGS. 12 and 13A, the development device 201*a* includes a development roller 201*f*, an agitation member 201*c*, and feeding members 201*d* and 201*e*. The developer replenished from the developer replenishment container 51 is agitated by the agitation member 201*c*, is sent to the development roller 201*f* by the feeding members 201*d* and 201*e*, and is supplied to the photoreceptor 154 by the development roller 201*f*.

Note that the development roller 201*f* has a development blade 201*g* that restricts a developer coating amount on the roller, and a leakage preventive sheet 201*h* that is disposed in contact with the development roller 201*f* in order to prevent leakage of the developer between the development device 201*a* and the development roller.

In addition, as illustrated in FIG. 13B, the attachment portion 70 has a rotation direction restricting portion (holding mechanism) 71 for restricting the movement of a flange portion 54 in a rotation direction by abutting on the flange portion 54 (see FIGS. 17A and 17B) of the developer replenishment container 51 when the developer replenishment container 51 is attached.

In addition, the attachment portion 70 has a developer receiving port (developer receiving hole) 73 for communicating with a discharge port (discharge hole) 54*a* (see FIG. 17B) of the developer replenishment container 51 to be described below and receiving the developer discharged from the developer replenishment container 51, when the developer replenishment container 51 is attached. Then, the developer is supplied from the discharge port 54*a* of the developer replenishment container 51 through the developer receiving port 73 to the development device 201*a*. Note that, in this example, a diameter $\phi$ of the developer receiving port 73 is set to about 2.5 mm as a fine port (pinhole) for the purpose of preventing contamination by the developer in the attachment portion 70 as much as possible. Note that the diameter of the developer receiving port 73 may be any diameter as long as the developer can be discharged from the discharge port 54*a*.

In addition, as illustrated in FIG. 14, the hopper 70*a* includes a conveyance screw 70*b* for conveying the developer to the development device 201*a*, an opening 70*c* communicating with the development device 201*a*, and a developer sensor 70*d* for detecting the amount of the developer accommodated in the hopper 70*a*.

Further, as illustrated in FIGS. 13B and 13C, the attachment portion 70 includes a drive gear 300 that functions as a driving mechanism (drive portion). The drive gear 300 has a function of transmitting a rotational driving force from a drive motor 500 via a drive gear train to apply the rotational driving force to the developer replenishment container 51 set in the attachment portion 70.

In addition, as illustrated in FIG. 14, in this configuration, the drive motor 500 is configured to operate under control of a control device (CPU) 600. As illustrated in FIG. 14, the control device 600 is configured to control the operation of the drive motor 500, based on developer remaining amount information input from the developer sensor 70*d*.

Note that, in this example, the drive gear 300 is set to rotate only in one direction in order to simplify the control of the drive motor 500. That is, the control device 600 is configured to control only ON (operation)/OFF (non-operation) of the drive motor 500. Hence, a driving mechanism of the developer replenishment device 201 can be simplified as compared with a configuration in which a reversal driving force obtained by periodically reversing the drive motor 500 (drive gear 300) in a forward direction and a reverse direction is applied to the developer replenishment container 51.

(Method for Attaching/Removing Developer Replenishment Container)

Next, a method for attaching/removing the developer replenishment container 51 will be described.

First, an operator opens a replacement cover and inserts and attaches the developer replenishment container 51 into and to the attachment portion 70 of the developer replenishment device 201. With this attachment operation, the flange portion 54 of the developer replenishment container 51 is held and fixed to the developer replenishment device 201.

Thereafter, when the operator closes the replacement cover, the attachment process ends. Thereafter, the control device 600 controls the drive motor 500 to rotate the drive gear 300 at an appropriate timing.

On the other hand, in a case of the empty developer replenishment container 51 without the developer, the operator opens the replacement cover and removes the developer replenishment container 51 from the attachment portion 70. Then, a new developer replenishment container 51 prepared in advance is inserted into and attached to the attachment portion 70, and the replacement cover is closed, so that the replacement work from the removal to re-attachment of the developer replenishment container 51 ends.

(Developer Replenishment Control by Developer Replenishment Device)

Next, developer replenishment control performed by the developer replenishment device 201 will be described with reference to a flowchart of FIG. 15. The developer replenishment control is executed by controlling various devices by the control device (CPU) 600.

In this example, the control device 600 controls the operation/non-operation of the drive motor 500 in response to an output of the developer sensor 70*d*, so that a certain amount or more of the developer is not accommodated in the hopper 70*a* in the configuration.

Specifically, first, the developer sensor 70*d* checks a developer accommodation amount in the hopper 70*a* (S100). In a case where it is determined that the developer accommodation amount detected by the developer sensor 70*d* is smaller than a predetermined amount, that is, in a case where the developer is not detected by the developer sensor 70*d*, the drive motor 500 is driven to execute a replenishing operation of the developer T for a certain period of time (S101).

As a result of the developer replenishing operation, in a case where it is determined that the developer accommodation amount detected by the developer sensor 70*d* has reached the predetermined amount, that is, in a case where the developer is detected by the developer sensor 70*d*, the drive of the drive motor 500 is turned off and the replenishing operation of the developer T is stopped (S102). By stopping the replenishing operation, a series of developer replenishing processes ends.

The developer replenishing processes are configured to be repeatedly executed when the developer is consumed along with the image formation and the developer accommodation amount in the hopper 70*a* becomes smaller than the predetermined amount.

Note that the developer discharged from the developer replenishment container 51 may be temporarily stored in the hopper 70*a* and then replenished to the development device 201*a*, and the developer replenishment device 201 may employ the following configuration.

Figure 16:
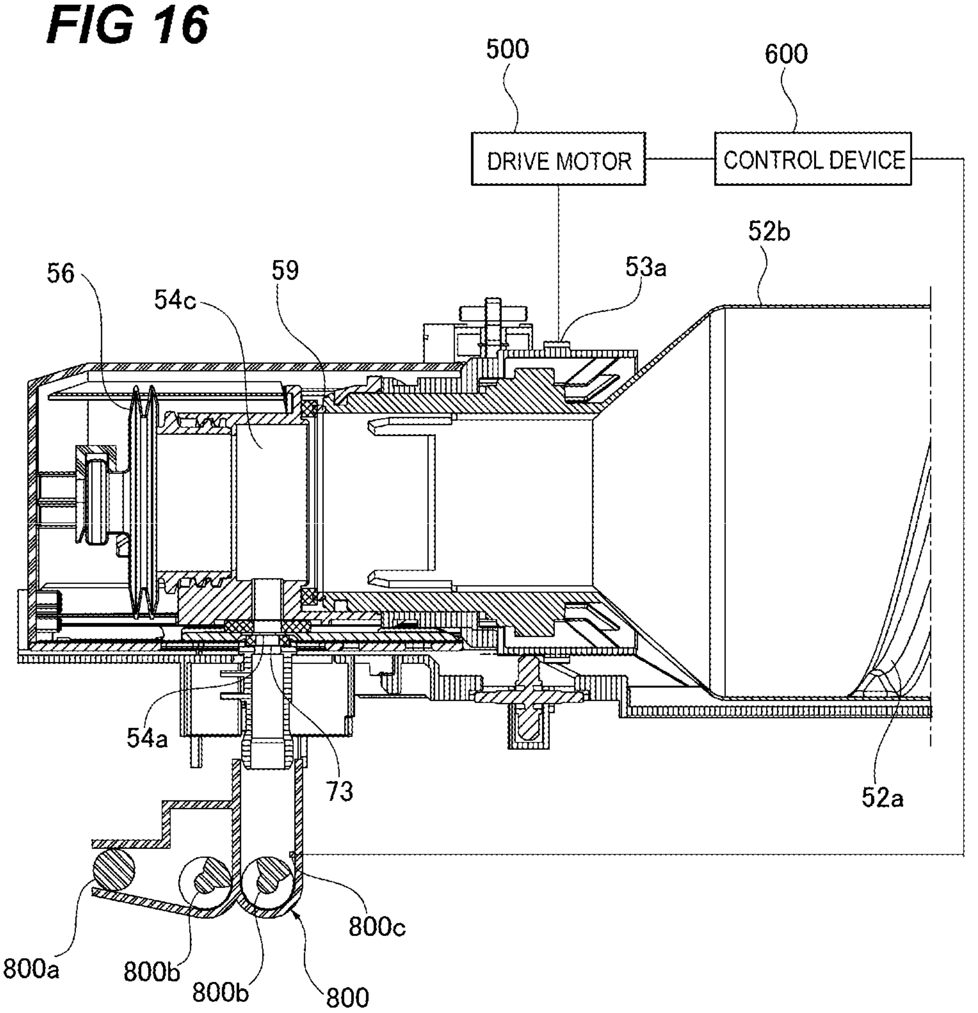
FIG. 16 is a partially enlarged cross-sectional view illustrating a modification example of the developer replenishment device.

Specifically, in this configuration, as illustrated in FIG. 16, the above-described hopper 70*a* is omitted, and the developer is directly replenished from the developer replenishment container 51 to the development device 201*a*. FIG. 16 illustrates an example in which a two-component development device 800 is used as the developer replenishment device 201. The development device 800 includes an agitation chamber into which the developer is replenished and a development chamber that supplies the developer T to a development sleeve 800*a*, and agitation screws 800*b* are installed to cause developer conveyance directions in the agitation chamber and the development chamber to be opposite to each other. In this configuration, the agitation chamber and the development chamber communicate with each other at both end portions in a longitudinal direction, and a two-component developer is circularly conveyed in these two chambers. In addition, in this configuration, a magnetic sensor 800*c* that detects a toner density in the developer is installed in the agitation chamber, and the control device 600 controls the operation of the drive motor 500, based on the detection result of the magnetic sensor 800*c*. In this configuration, the developer that is replenished from the developer replenishment container 51 is a non-magnetic toner, or a non-magnetic toner and a magnetic carrier.

In this example, since the developer in the developer replenishment container 51 is hardly discharged from the discharge port 54*a* only by the gravity action, and the developer is discharged by a variable volume operation by the pump 56, it is possible to suppress variations in discharge amount. Therefore, the hopper 70*a* can be omitted, and the developer can be stably replenished to the development chamber even in the example illustrated in FIG. 16.

(Developer Replenishment Container)

Figure 17A:
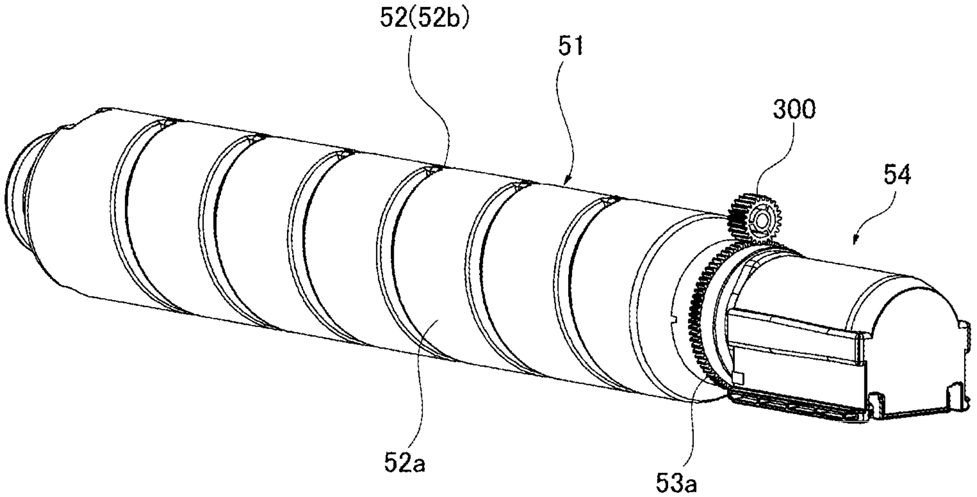
FIG. 17A is a perspective view illustrating a developer replenishment container according to Example 4.
Figure 17B:
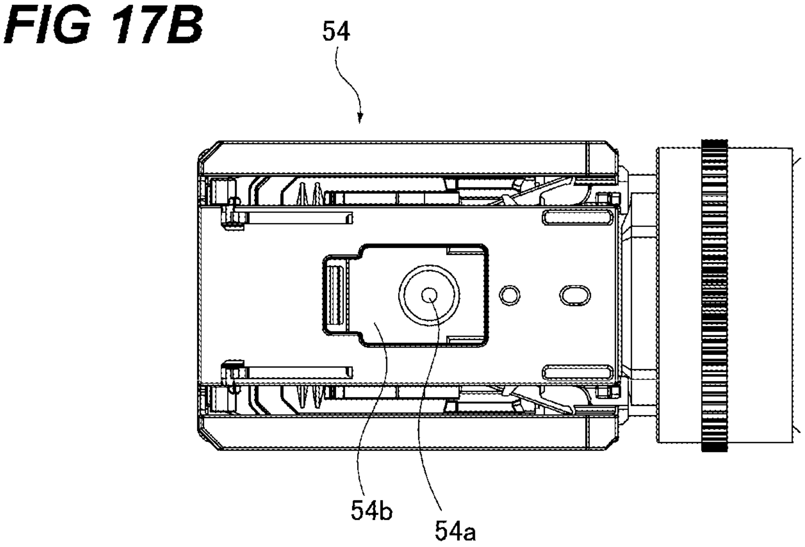
FIG. 17B is a partially enlarged view illustrating a state around a discharge port.

Next, a configuration of the developer replenishment container 51 which is a configurational element of the developer replenishment system will be described with reference to FIGS. 17A, 17B, and 18A. Here, FIG. 17A is an overall perspective view of the developer replenishment container 51, and FIG. 17B is a partially enlarged view around the discharge port 54*a* of the developer replenishment container 51. In addition, FIG. 18A is a partial cross-sectional perspective view of the developer replenishment container 51.

Figure 18A:
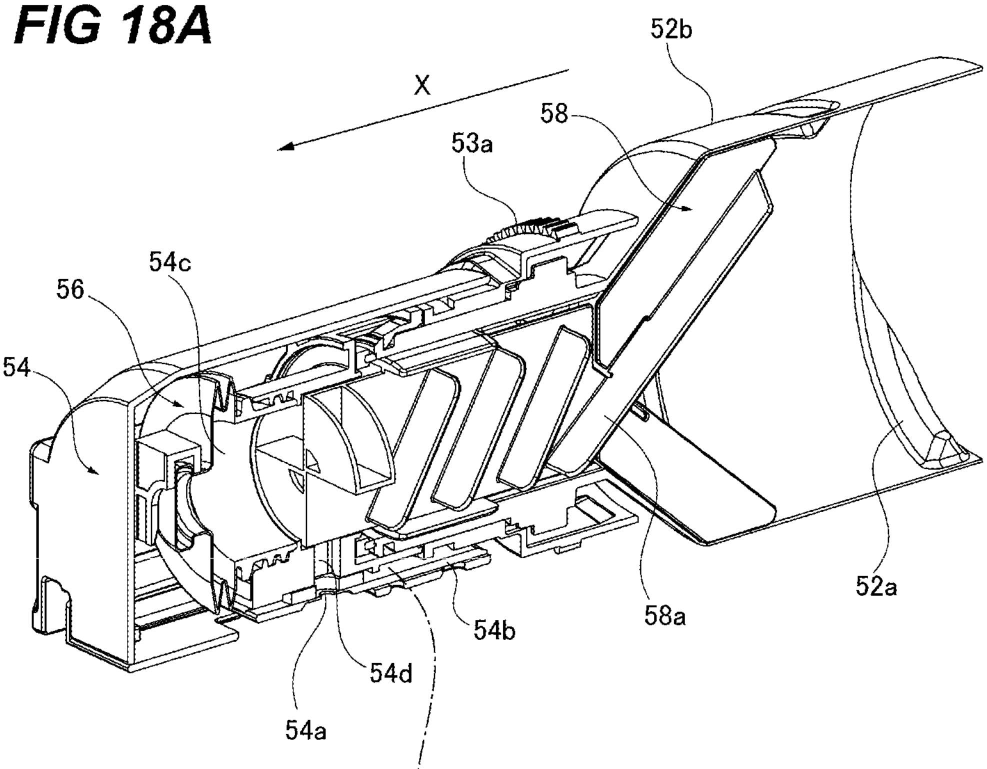
FIG. 18A is a partial cross-sectional perspective view of the developer replenishment container.

As illustrated in FIGS. 17A and 18A, the developer replenishment container 51 has a developer accommodation portion 52 that is formed in a hollow cylindrical shape and has an internal space in which the developer is accommodated. Further, the developer replenishment container 51 has a flange portion 54 (also referred to as a non-rotating portion) on one end side of the developer accommodation portion 52 in a longitudinal direction (developer conveyance direction) thereof. In addition, a cylindrical portion 52*b* is configured to be relatively rotatable with respect to the flange portion 54. Note that a cross-sectional shape of the cylindrical portion 52*b* may be a non-circular shape within a range in which a rotation operation is not affected in the developer replenishing process. For example, an elliptical shape or a polygonal shape may be employed.

In addition, in this example, as illustrated in FIGS. 17A, 17B, and 18A, the cylindrical portion 52*b* and a discharge portion 54*c* are configured to be arranged in the developer conveyance direction (downstream in the X direction illustrated in FIG. 18A) when the developer replenishment container 51 is attached to the developer replenishment device 201. That is, a length of the cylindrical portion 52*b* in the developer conveying direction is sufficiently longer than a length thereof in a perpendicular direction to the developer conveying direction and is connected to the discharge portion 54*c*, on the developer conveying direction side of the cylindrical portion. Hence, when the developer replenishment container 51 is attached to the developer replenishment device 201, an amount of the developer present on the discharge port 54*a* to be described below can be reduced as compared with the case where the cylindrical portion 52*b* is configured to be positioned vertically above the discharge portion 54*c*. Therefore, the developer in the vicinity of the discharge port 54*a* is unlikely to be compacted, and an intake/exhaust operation can be smoothly performed.

(Material of Developer Replenishment Container)

In this example, as will be described below, the developer is discharged from the discharge port 54*a* by a configuration in which a volume in the developer replenishment container 51 is changed by the pump 56. Accordingly, as a material of the developer replenishment container 51, a material having stiffness to the extent that the developer replenishment container does not significantly collapse or does not significantly expand with respect to a change in volume can be employed.

In addition, in this example, the developer replenishment container 51 is configured to communicate with the outside only through the discharge port 54*a* and be sealed from the outside except for the discharge port 54*a*. That is, since a configuration in which the volume of the developer replenishment container 51 is reduced or increased by the pump 56 and the developer is discharged from the discharge port 54*a* is employed, there is a demand for airtightness to the extent that stable discharge performance is maintained.

Therefore, in this example, a material of the cylindrical portion 52*b* which is the developer accommodation portion 52 is PET resin, a material of the discharge portion 54*c* is polystyrene resin, and a material of the pump 56 is polypropylene resin.

Note that, regarding the materials to be used, for example, other resins such as acrylonitrile-butadiene-styrene copolymer (ABS), polyester, polyethylene, or polypropylene can be used as long as the materials enable the cylindrical portion 52*b* and the discharge portion 54*c* to withstand variable volumes.

In addition, the material of the pump 56 may be any material as long as the material exhibits a stretching function and can change the volume of the developer replenishment container 51 by a change in volume. For example, acrylonitrile-butadiene-styrene copolymer (ABS), polystyrene, polyester, polyethylene, or the like may be formed to be thin. In addition, rubber, other stretchable materials, or the like can be used.

Note that, as long as each of the pump 56, the cylindrical portion 52*b*, and the discharge portion 54*c* satisfies the above-described function by adjusting a thickness of a resin material, the pump, the cylindrical portion, and the discharge portion may be integrally molded using the same material, for example, using an injection molding method, a blow molding method, or the like.

Hereinafter, configurations of the flange portion 54, the cylindrical portion 52*b*, the pump 56, a drive receiving mechanism, and a drive converting mechanism (cam groove 53*b*) in the developer replenishment container 51 will be described sequentially in detail.

(Flange Portion)

Figure 18B:
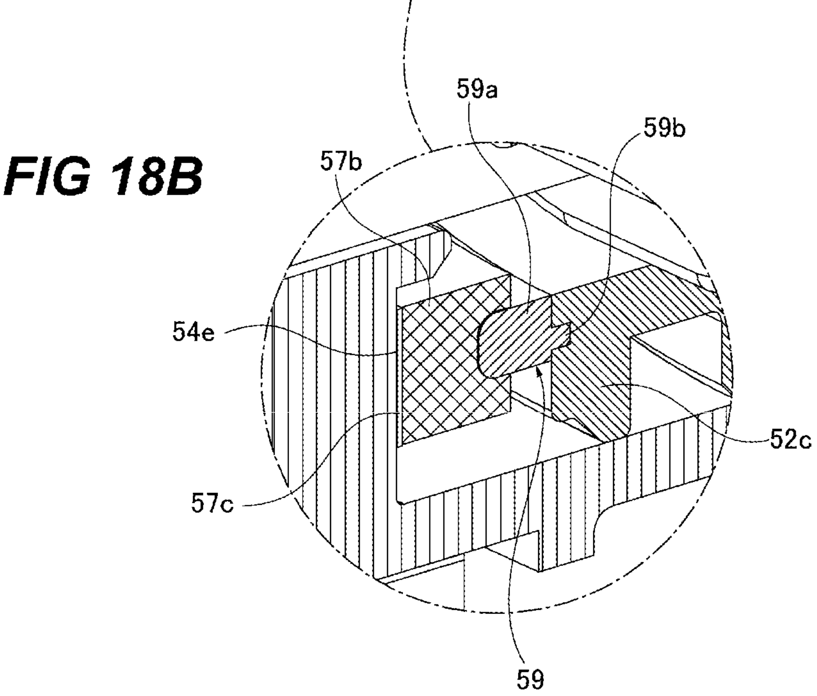
FIG. 18B is an enlarged cross-sectional perspective view around a pressing member in this example.

Next, the flange portion 54 will be described with reference to FIGS. 18A and 18B. FIG. 18B is an enlarged perspective view around a pressing member 59 in Example 4.

As illustrated in FIG. 18A, the flange portion 54 has a hollow discharge portion (developer discharge chamber) 54*c* for temporarily accommodating the developer conveyed from the cylindrical portion 52*b*. A small discharge port 54*a* for allowing the developer to be discharged to the outside of the developer replenishment container 51, that is, for replenishing the developer to the developer replenishment device 201, is formed at a bottom of the discharge portion 54*c*. A size of the discharge port 54*a* will be described below. In addition, a developer storage portion 54*d* capable of storing a certain amount of the developer before discharge is provided above the discharge port 54*a*.

Further, the flange portion 54 has a shutter 54*b* having the discharge port 54*a*. The shutter 54*b* is configured to bump into a bump portion 31 (see FIG. 13B) provided in the attachment portion 70 according to the attachment operation of the developer replenishment container 51 to the attachment portion 70. Hence, the shutter 54*b* relatively slides with respect to the developer replenishment container 51 in a rotational axis direction (the direction opposite to the X direction) of the cylindrical portion 52*b* according to the attachment operation of the developer replenishment container 51 to the attachment portion 70. Note that when this series of operations ends, the discharge port 54*a* provided in the shutter 54*b* is configured to move to a position below the developer storage portion 54*d*. At this time, since the discharge port 54*a* is aligned with the developer receiving port 73 of the attachment portion 70 illustrated in FIG. 13C, the ports communicate with each other, and developer replenishment from the developer replenishment container 51 can be performed.

In addition, the flange portion 54 is configured to be substantially immovable when the developer replenishment container 51 is attached to the attachment portion 70 of the developer replenishment device 201. Specifically, the developer replenishment device 201 has the rotation direction restricting portion 71 illustrated in FIG. 13B so that the flange portion 54 does not rotate in a rotation direction of the cylindrical portion 52*b* by itself. Hence, in a state where the developer replenishment container 51 is attached to the developer replenishment device 201, the discharge portion 54*c* provided in the flange portion 54 is also substantially prevented from rotating in the rotation direction of the cylindrical portion 52*b* (allowing movement in a degree of rattling). On the other hand, the cylindrical portion 52*b* is configured to rotate in the developer replenishing processes without being restricted in the rotation direction by the developer replenishment device 201.

In addition, as illustrated in FIG. 18A, a plate-shaped conveyance member 58 for conveying, to the discharge portion 54*c*, the developer conveyed by a conveyance protrusion (protruding portion) 52*a* spirally projecting from the cylindrical portion 52*b* is provided. The conveyance member 58 is provided to substantially divide a partial region of the developer accommodation portion 52 into two regions and is configured to rotate integrally with the cylindrical portion 52*b*. A plurality of inclined ribs 58*a* inclined toward the discharge portion 54*c* with respect to the rotational axis direction of the cylindrical portion 52*b* are provided on both surfaces of the conveyance member 58.

With the above-described configuration, the developer conveyed by the conveyance protrusion 52*a* is drawn up from a lower side to an upper side in a vertical direction by the plate-shaped conveyance member 58 in conjunction with the rotation of the cylindrical portion 52*b*. Thereafter, as the rotation of the cylindrical portion 52*b* progresses, the developer falls down along a surface of the conveyance member 58 by gravity and is eventually delivered to the discharge portion 54*c* side by the inclined ribs 58*a*. In this configuration, the inclined ribs 58*a* are provided at both surfaces of the conveyance member 58 such that the developer is fed to the discharge portion 54*c* each time the cylindrical portion 52*b* makes a half turn.

In addition, as illustrated in FIG. 18B, the flange portion 54 of the non-rotating portion has an elastic member installing surface 54*e* on which a flange seal 57*b* is bonded with an adhesive 57*c* (employing a double-sided tape in this example), and the flange seal 57*b* is fixed to the flange portion 54.

(Cylindrical Portion)

Next, the cylindrical portion 52*b* functioning as a developer accommodating space will be described with reference to FIGS. 17A, 17B, 18A, 18B, 21A, 21B, 22A, and 22B.

Figure 21A:
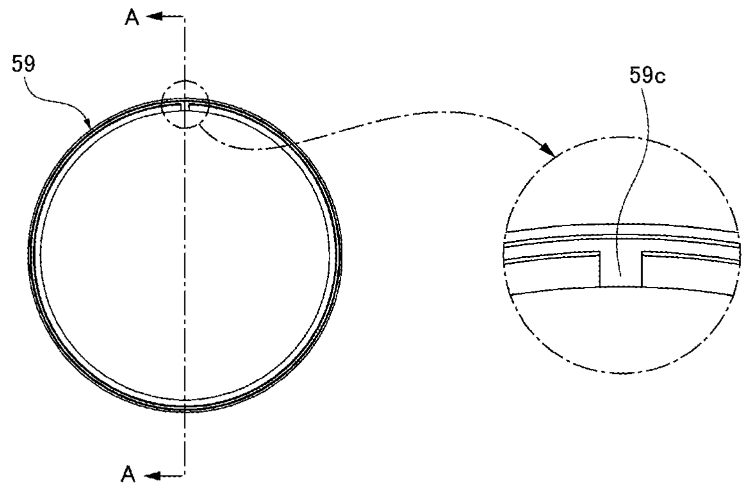
FIG. 21A illustrates a back view of a pressing member and an enlarged view around a rotation restricting portion in Example 4.
Figure 21B:
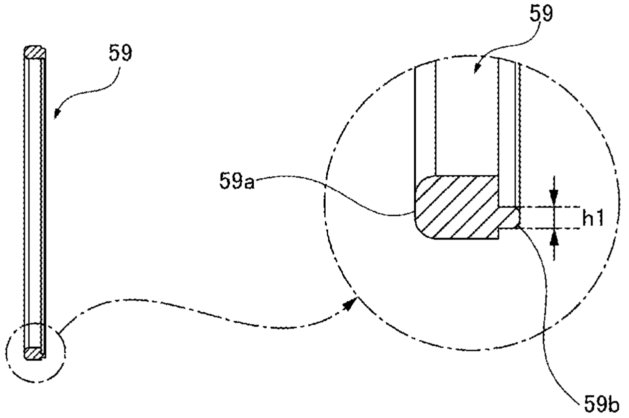
FIG. 21B illustrates a cross-sectional view and an enlarged cross-sectional view of the pressing member in Example 4.
Figure 22A:
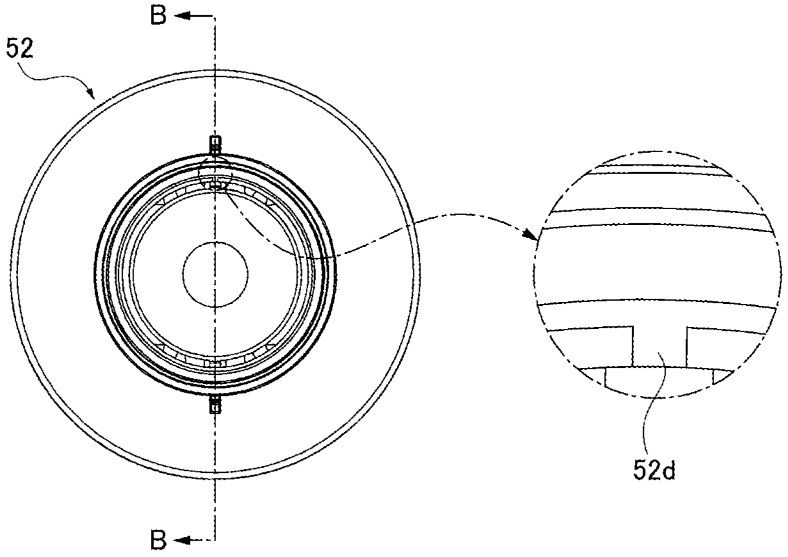
FIG. 22A illustrates a front view of a developer accommodation portion and an enlarged view around a rotation restricting groove.
Figure 22B:
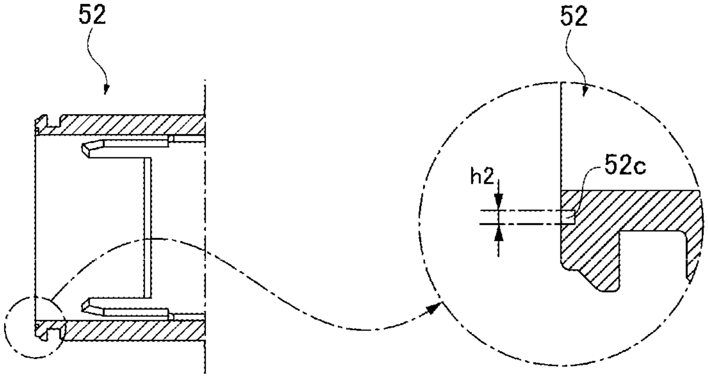
FIG. 22B illustrates a cross-sectional view and an enlarged cross-sectional view of the developer accommodation portion.

FIG. 21A illustrates a back view of the pressing member 59 and an enlarged view around a rotation restricting portion 59*c*, and FIG. 21B illustrates a cross-sectional view and an enlarged cross-sectional view of the pressing member 59. FIG. 22A illustrates a front view of the developer accommodation portion 52 and an enlarged view around a rotation restricting groove 52*d*, and FIG. 22B illustrates a cross-sectional view and an enlarged cross-sectional view of the developer accommodation portion 52.

As illustrated in FIGS. 17A and 18A, the cylindrical portion 52*b* has the conveyance protrusion 52*a* projecting in a spiral shape for conveying the accommodated developer toward the discharge portion 54*c* (discharge port 54*a*) by the rotation of the cylindrical portion. In addition, the cylindrical portion 52*b* is formed by a blow molding method using the resin of the above-described material.

Note that, in a case where the volume of the developer replenishment container 51 is increased to increase a filling amount, it is conceivable to increase a volume of the discharge portion 54*c* as the developer accommodating space in a height direction. However, in such a configuration, the gravity action on the developer in the vicinity of the discharge port 54*a* further increases due to the weight of the developer. As a result, the developer in the vicinity of the discharge port 54*a* is easily compressed, and air intake/exhaust via the discharge port 54*a* is hindered. In this case, it is necessary to further increase a volume change amount of the pump 56 in order to release the developer compressed by the intake from the discharge port 54*a* or discharge the developer by the exhaust. However, in this case, a driving force for driving the pump 56 also increases, and a very high load may be applied to the image forming apparatus body 150.

In this respect, in this example, since the cylindrical portion 52*b* is disposed side by side with the flange portion 54 in a horizontal direction, and the filling amount is adjusted by the volume of the cylindrical portion 52*b*, a thickness of a developer layer on the discharge port 54*a* in the developer replenishment container 51 can be set to be thinner than that in the above-described configuration. Consequently, the developer is less likely to be compressed by the gravity action, and as a result, it is possible to stably discharge the developer without applying a load to the image forming apparatus body 150.

Note that, the cylindrical portion 52*b* has the pressing member 59 (see FIGS. 18B and 21A) that is a separate member from the cylindrical portion 52*b* in a direction from the cylindrical portion 52*b* to the discharge port 54*a* (M direction illustrated in FIG. 13C).

That is, the cylindrical portion 52*b* and the pressing member 59 are separate members, and the pressing member 59 is removably provided to the cylindrical portion 52*b*. The pressing member 59 is configured to relatively rotate while compressing the flange seal 57*b*. Note that the pressing member 59 will be described below in detail. In order to transmit the rotation of the cylindrical portion 52*b* to the pressing member 59, the cylindrical portion 52*b* has the rotation restricting groove 52*d* to engage with the rotation restricting portion 59*c* (see FIG. 21A) of the pressing member 59. The cylindrical portion 52*b* has an engagement portion 52*c* for performing press-fitting into a press-fitting portion 59*b* (see FIGS. 18B and 21B) of the pressing member 59 in order to fill a gap between the pressing member 59 and the cylindrical portion 52*b*.

Consequently, the gap between the cylindrical portion 52*b* and the pressing member 59 and a gap between the pressing member 59 and the flange seal 57*b* are sealed, so that the developer does not leak during the rotation and airtightness is maintained. That is, the air appropriately flows in and out through the discharge port 54*a*, and the variable volumes of the developer replenishment container 51 during the replenishment can be set to a desired state.

Note that, in this example, the cylindrical portion 52*b* occupies most of the developer replenishment container 51 in terms of the weight ratio. As will be described below, the cylindrical portion 52*b* is an important member in reusing the collected developer replenishment container 51.

(Pump)

Next, the pump 56 having a volume varying depending on the reciprocating motion will be described with reference to FIG. 18A.

The pump 56 in this example functions as an intake/exhaust mechanism that alternately performs an intake operation and an exhaust operation via the discharge port 54*a*. In other words, the pump 56 functions as an airflow generating mechanism that alternately and repeatedly generates an airflow toward the inside of the developer replenishment container 51 and an airflow from the developer replenishment container 51 toward the outside through the discharge port 54*a*.

As illustrated in FIG. 18A, the pump 56 is provided downstream from the discharge portion 54*c* in the X direction. That is, since the pump 56 is fixed to the discharge portion 54*c*, the pump does not rotate.

In addition, the pump 56 of this example has a developer accommodating space capable of accommodating the developer therein. As will be described below, the developer accommodating space in the pump 56 plays a major role in fluidizing the developer during the intake operation.

In this example, as the pump 56, a variable volume pump (bellows-shaped pump) made of resin which has a volume variable depending on the reciprocating motion is employed. Specifically, as illustrated in FIG. 18A, the bellows-shaped pump is employed, and a plurality of "mountain-fold" portions and "valley-fold" portions are cyclically and alternately formed. Hence, the pump 56 can alternately and repeatedly perform contraction and extension by the driving force received from the developer replenishment device 201.

The pump 56 is employed, thereby enabling the volume of the developer replenishment container 51 to be varied and to be alternately and repeatedly changed at a predetermined cycle. As a result, the developer in the discharge portion 54*c* can be efficiently discharged from the discharge port 54*a* having a small diameter (diameter of about 2.5 mm).

Note that, in this example, the pump 56 is employed to enable the diameter of the discharge port 54*a* to be reduced, but since the discharge port 54*a* can have a large diameter, thereby enabling the developer to be discharged by self-weight conveyance, the pump 56 may not be provided. That is, the developer replenishment container 51 may not include the pump 56, a reciprocation member 55 serving as a drive converting mechanism, and the cam groove 53*b* (to be described below in detail). However, since the developer replenishment container 51 and the developer replenishment device 201 increase in size as the diameter of the discharge port 54*a* increases, the pump 56 is employed to achieve a decrease in size in this example.

(Drive Receiving Mechanism)

Next, the drive receiving mechanism (a drive input portion and a driving force receiving portion) of the developer replenishment container 51, which receives a rotational driving force for rotating the cylindrical portion 52*b* including the conveyance protrusion 52*a* from the developer replenishment device 201, will be described with reference to FIGS. 17A and 18A.

As illustrated in FIGS. 17A and 18A, the developer replenishment container 51 has a gear portion 53*a* that functions as the drive receiving mechanism (the drive input portion and the driving force receiving portion) engageable with (can be drivably coupled to) the drive gear 300 (functioning as a driving mechanism) of the developer replenishment device 201. The gear portion 53*a* is configured to be integrally rotatable with the cylindrical portion 52*b*.

Hence, the cylindrical portion 52*b* integrally rotates by the rotational driving force input from the drive gear 300 to the gear portion 53*a*, so that the developer accommodated in the cylindrical portion 52*b* can be conveyed to the discharge portion 54*c*.

Note that, in this example, the gear portion 53*a* is provided downstream from the substantially center of the developer accommodation portion 52 in the X direction (see FIG. 18A). However, the position of the gear portion is not limited to such an example, and for example, the gear portion may be provided at an end portion positioned upstream from the substantially center of the developer accommodation portion 52 in the X direction. In this case, the drive gear 300 is installed at a corresponding position.

In addition, in this example, a gear mechanism is used as a drive-coupling mechanism between the drive input portion of the developer replenishment container 51 and the drive portion of the developer replenishment device 201, but the mechanism is not limited to such an example, and for example, a known coupling mechanism may be used. Specifically, a non-circular recess portion may be provided as the drive input portion, and a projecting portion having a shape corresponding to the recess portion may be provided as the drive portion of the developer replenishment device 201, and these portions may be drivably coupled to each other.

(Drive Converting Mechanism)

Figure 19A:
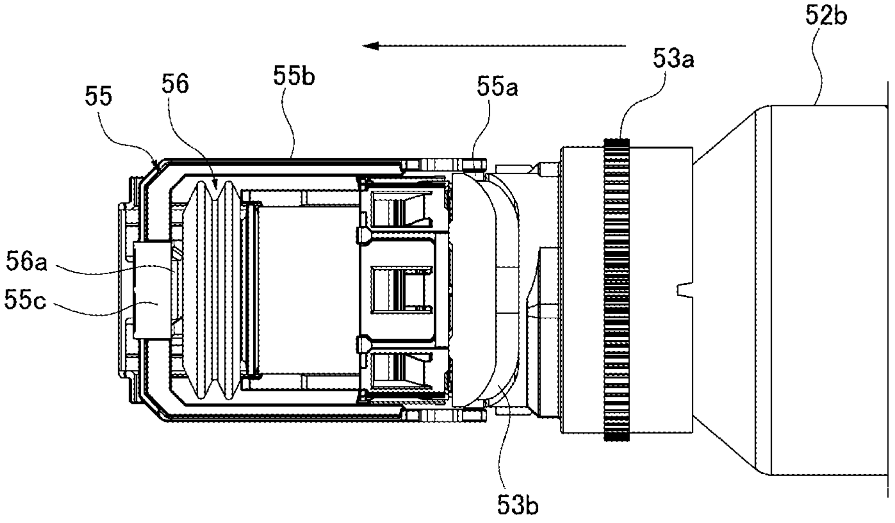
FIG. 19A is a partial view of a state in which a pump is maximally extended in use.
Figure 19B:
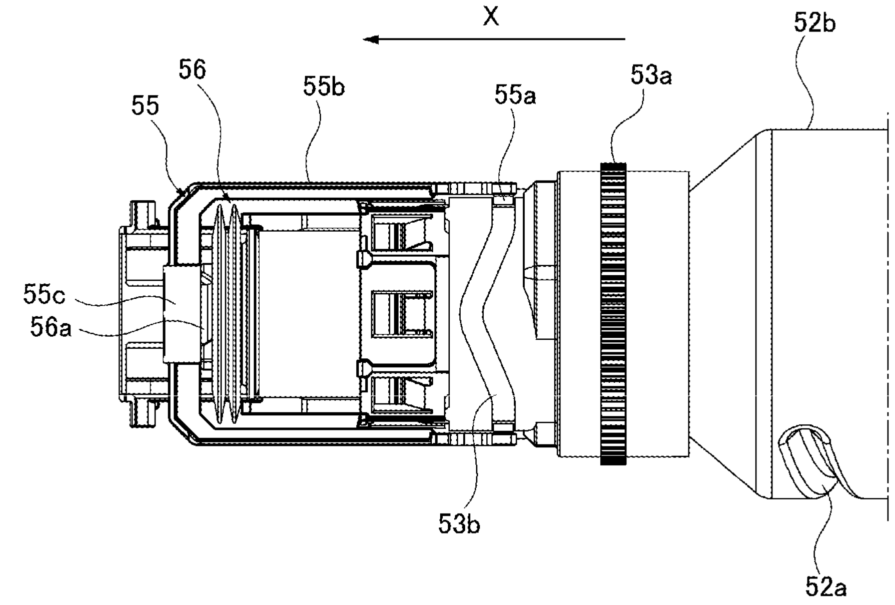
FIG. 19B is a partial view of a state in which the pump is maximally contracted in use.

Next, the drive converting mechanism (drive converting portion) of the developer replenishment container 51 will be described. Note that, in this example, a case where a cam mechanism is used as an example of the drive converting mechanism will be described with reference to FIGS. 19A and 19B. FIG. 19A is a partial view of a state in which the pump 56 is maximally extended for use, and FIG. 19B is a partial view of a state in which the pump 56 is maximally contracted for use.

The developer replenishment container 51 has a cam mechanism functioning as a drive converting mechanism (drive converting portion) that converts the rotational driving force for rotating the cylindrical portion 52*b* received by the gear portion 53*a* into a force in a direction to cause the pump 56 to reciprocate.

That is, in this example, by converting the rotational driving force received by the gear portion 53*a* into a reciprocating force on the developer replenishment container 51 side, the driving force to rotate the cylindrical portion 52*b* and the driving force to cause the pump 56 to reciprocate are received by one drive input portion (gear portion 53*a*) in the configuration.

Consequently, the configuration of the drive input mechanism of the developer replenishment container 51 can be simplified as compared with a case where two drive input portions are separately provided in the developer replenishment container 51. Further, since the drive is received from one drive gear of the developer replenishment device 201 in the configuration, it is possible to contribute to simplification of the driving mechanism of the developer replenishment device 201.

As illustrated in FIGS. 19A and 19B, the reciprocation member 55 is used as a member interposed for converting the rotational driving force into the reciprocating force of the pump 56. Specifically, the drive input portion (gear portion 53*a*) which receives rotation drive from the drive gear 300 and the cam groove 53*b* which is integrated with the drive input portion (gear portion 53*a*) and has a groove all over the circumference thereof rotates. The cam groove 53*b* will be described below. A reciprocation member protrusion 55*a* partially projecting from an arm 55*b* of the reciprocation member 55 engages with the cam grooves 53*b*. Therefore, the reciprocation member protrusion 55*a* reciprocates in the X direction or the opposite direction thereof along the groove of the cam groove 53*b*, and the reciprocating movement becomes a reciprocating force of the pump 56 since an engagement portion 56*a* of the pump 56 and an engagement portion 55*c* provided in the reciprocation member 55 engage with each other. Note that the reciprocation member 55 is regulated so as not to rotate itself in the rotation direction of the cylindrical portion 52*b* (allowing a degree of rattling).

That is, when the cam groove 53*b* is rotated by the rotational driving force input from the drive gear 300, the reciprocation member protrusion 55*a* reciprocates in the X direction or the opposite direction along the cam groove 53*b*. Therefore, the pump can be integrated with the reciprocation member 55, and the volume of the developer replenishment container 51 can be changed by alternately repeating a state in which the pump 56 is extended (FIG. 19A) and a state in which the pump 56 is contracted (FIG. 19B).

Note that the arrangement number of reciprocation member protrusions 55*a* may be at least one. However, since there is a possibility that moment will be generated in the drive converting mechanism or the like due to a drag during extension and contraction of the pump 56, and smooth reciprocation is not performed, a plurality of reciprocation member protrusions 55*a* can be provided so as not to break a relationship with the shape of the cam groove 53*b* to be described below. In this example, two reciprocation member protrusions 55*a* engage with the cam groove 53*b* to face each other at about 180°.

(Arrangement Position of Drive Converting Mechanism)

In this example, as illustrated in FIGS. 19A and 19B, the drive converting mechanism (a cam mechanism configured to have the reciprocation member protrusions 55*a* and the cam groove 53*b*) is provided outside the developer accommodation portion 52. That is, the drive converting mechanism is provided at a position separated from internal spaces of the cylindrical portion 52*b*, the discharge portion 54*c*, and the pump 56 so as not to come into contact with the developer accommodated inside the cylindrical portion 52*b*, the discharge portion 54*c*, and the pump 56 functioning as the developer accommodating space.

Consequently, it is possible to solve a problem assumed when the drive converting mechanism is provided in the developer accommodating space. That is, it is possible to prevent that heat and pressure are applied to the particles of the developer due to the intrusion of the developer into a rubbing portion of the drive converting mechanism, the particles are softened, and some particles adhere to each other to form a large lump (coarse particles), and torque increases due to the developer being caught in the converting mechanism.

Hereinafter, the developer replenishing process to the developer replenishment device 201 by the developer replenishment container 51 will be described.

(Setting Condition of Cam Groove)

Figure 20:
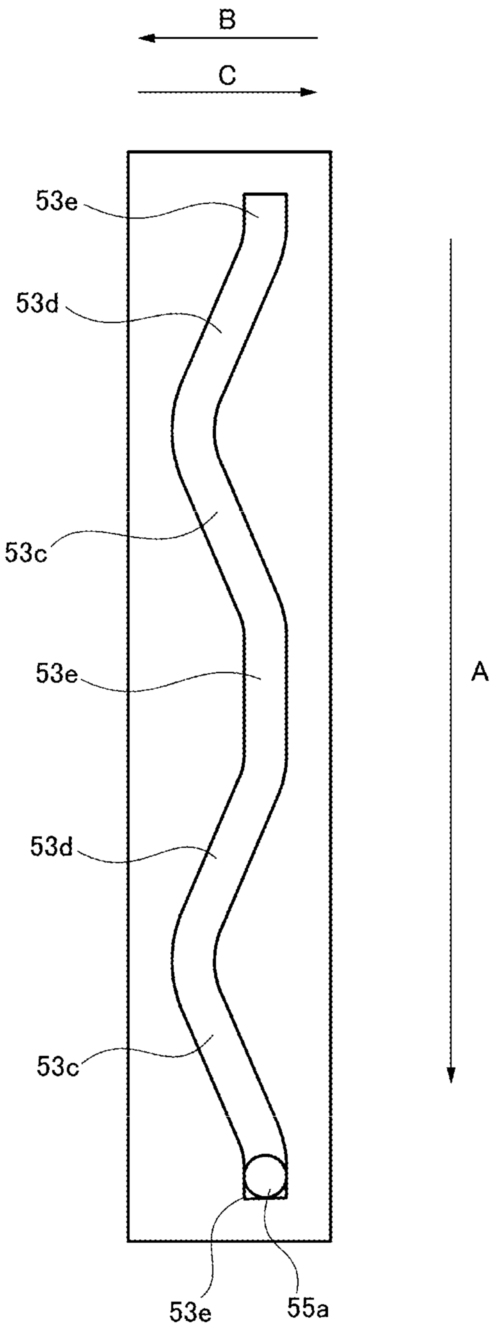
FIG. 20 is a developed view illustrating a cam groove shape of the developer replenishment container.

A setting condition of the cam groove 53*b* will be described with reference to FIG. 20. FIG. 20 is a developed view of the cam groove 53*b* of the drive receiving member 53 illustrated in FIG. 19. In FIG. 20, an arrow A indicates a rotation direction of the developer accommodation portion 52 (a moving direction of the cam groove 53*b*), an arrow B indicates an extending direction of the pump 56, and an arrow C indicates a compression direction of the pump 56. The cam groove 53*b* includes a cam groove 53*c* of a groove used when the pump 56 is extended, a cam groove 53*d* of the groove used when the pump 56 is compressed, and a cam groove 53*e* in which the pump 56 does not reciprocate.

The developer replenishing process in a state where the reciprocation member protrusions 55*a* engage with the cam groove 53*c*, the cam groove 53*d*, and the cam groove 53*e* will be described below.

(Developer Replenishing Process)

Next, the developer replenishing process by the pump 56 will be described with reference to FIGS. 19A to 20.

In this example, as will be described below, an intake process (intake operation via the discharge port 54*a*) and an exhaust process (exhaust operation via the discharge port 54*a*) performed by a pump operation, and an operation stopping process (intake and exhaust are not performed from the discharge port 54*a*) performed by non-operation of the pump are provided in the configuration. In addition, the drive converting mechanism is configured to convert the rotational driving force into the reciprocating force of the pump. Hereinafter, the intake process, the exhaust process, and the operation stopping process will be described sequentially in detail.

(Intake Process)

First, the intake process (intake operation via the discharge port 54*a*) will be described.

FIG. 19B illustrating a state in which the pump 56 contracts the most by the drive converting mechanism (cam mechanism) described above is changed to FIG. 19A illustrating a state in which the pump 56 is extended the most, and thereby the intake operation is performed. That is, a volume of the inside of the developer replenishment container 51 (the cylindrical portion 52*b*, the discharge portion 54*c*, and the pump 56) functioning as the developer accommodating space increases according to the intake operation.

At this time, the inside of the developer replenishment container 51 is substantially sealed except for the discharge port 54*a*, and the discharge port 54*a* is substantially closed with the developer. Therefore, an internal pressure of the developer replenishment container 51 decreases as the volume of the portion of the developer replenishment container 51 capable of accommodating the developer increases.

At this time, the internal pressure of the developer replenishment container 51 becomes lower than the atmospheric pressure (external pressure). Therefore, the air outside the developer replenishment container 51 moves into the developer replenishment container 51 through the discharge port 54*a* due to a pressure difference between the inside and the outside of the developer replenishment container 51.

At this time, since the air is taken in from the outside of the developer replenishment container 51 through the discharge port 54*a*, the developer located in the vicinity of the discharge port 54*a* can be released (fluidized). Specifically, the air is contained in the developer located in the vicinity of the discharge port 54*a*, so that bulk density can be reduced, and the developer can be fluidized appropriately.

Further, at this time, since the air is taken into the developer replenishment container 51 through the discharge port 54*a*, the internal pressure of the developer replenishment container 51 remains close to the atmospheric pressure (external pressure) even though the volume of the developer replenishment container increases.

By fluidizing the developer in this manner, the developer can be smoothly discharged from the discharge port 54*a* without clogging the discharge port 54*a* with the developer at the time of the exhaust operation to be described below. Hence, the amount (per unit time) of the developer discharged from the discharge port 54*a* can be made substantially constant over a long period of time.

Note that, in order to perform the intake operation, the operation is not limited to a change from the most contracted state to the most extended state of the pump 56, and even if the pump 56 is stopped in the middle of the change from the most contracted state to the most extended state, the intake operation is performed as long as the internal pressure of the developer replenishment container 51 is changed. That is, the intake process is performed to a state in which the reciprocation member protrusions 55*a* engage with the cam grooves 53*c* illustrated in FIG. 20.

(Exhaust Process)

Next, the exhaust process (exhaust operation through the discharge port 54*a*) will be described.

When FIG. 19A indicating the state in which the pump 56 extends the most is changed to FIG. 19B indicating the state in which the pump 56 contracts the most, the exhaust operation is performed. Specifically, a volume of the inside of the developer replenishment container 51 (the cylindrical portion 52*b*, the discharge portion 54*c*, and the pump 56) functioning as the developer accommodating space decreases according to the exhaust operation. At this time, the inside of the developer replenishment container 51 is substantially sealed except for the discharge port 54*a*, and the discharge port 54*a* is substantially closed by the developer until the developer is discharged. Hence, as the internal volume of the developer replenishment container 51 decreases, the internal pressure of the developer replenishment container 51 increases.

At this time, since the internal pressure of the developer replenishment container 51 is higher than the atmospheric pressure (external pressure), the developer is pushed out from the discharge port 54*a* due to the pressure difference between the inside and the outside of the developer replenishment container 51. That is, the developer is discharged from the developer replenishment container 51 to the developer replenishment device 201.

Since the air in the developer replenishment container 51 is also discharged together with the developer, the internal pressure of the developer replenishment container 51 decreases.

As described above, in this example, since the developer can be efficiently discharged using one reciprocating pump 56, the mechanism suitable for discharging the developer can be simplified.

Note that, in order to perform the exhaust operation, the operation is not limited to a change from the most extended state to the most contracted state of the pump 56, and even if the pump 56 is stopped in the middle of the change from the most extended state to the most contracted state, the exhaust operation is performed as long as the internal pressure of the developer replenishment container 51 is changed. That is, the exhaust process is performed in a state in which the reciprocation member protrusions 55*a* engage with the cam grooves 53*d* illustrated in FIG. 20.

(Operation Stopping Process)

Next, the operation stopping process in which the pump 56 does not reciprocate will be described.

As described above, in the case of employing the configuration in which the hopper 70*a* is omitted and the control device 600 controls the operation of the drive motor 500, based on the detection result of the magnetic sensor 800*c*, the amount of the developer discharged from the developer replenishment container 51 directly affects the toner density. Therefore, it is necessary to replenish the developer amount required by the image forming apparatus 150 from the developer replenishment container 51. At this time, in order to stabilize the amount of the developer discharged from the developer replenishment container 51, it is desirable to maintain variable volumes fixed every time.

For example, in the case of the cam groove 53*b* configured only through the exhaust process and the intake process, the motor driving is stopped in the middle of the exhaust process or the intake process. At this time, the cylindrical portion 52*b* rotates by inertia even after the drive motor 500 stops rotating, and the pump 56 continues to reciprocate in conjunction with the cylindrical portion 52*b* until the cylindrical portion 52*b* stops, so that the exhaust process or the intake process is performed. A distance by which the cylindrical portion 52*b* rotates by inertia depends on a rotational speed of the cylindrical portion 52*b*. Further, the rotational speed of the cylindrical portion 52*b* depends on the torque applied to the drive motor 500. Thus, since the torque to the motor may change depending on the amount of the developer in the developer replenishment container 51, and the speed of the cylindrical portion 52*b* may also change, it is difficult for the pump 56 to have the same stop position every time.

In this respect, in order to stop the pump 56 at a fixed position every time, it is necessary to provide a region where the pump 56 does not reciprocate in the cam groove 53*e* even when the cylindrical portion 52*b* is rotating. In this example, a cam groove 53*e* illustrated in FIG. 20 is provided to prevent the pump 56 from reciprocating. The cam groove 53*e* has a straight shape in which a groove is formed in the rotation direction of the cylindrical portion 52*b* and the reciprocation member 55 does not move even when rotating. That is, the operation stopping process is performed to a state in which the reciprocation member protrusions 55*a* engage with the cam grooves 53*e*.

In addition, the fact that the pump 56 does not reciprocate means that the developer is not discharged from the discharge port 54*a* (allowing the developer to fall from the discharge port 54*a* due to oscillation or the like at the time of rotation of the cylindrical portion 52*b*). That is, the cam groove 53*e* may be inclined in the rotational axis direction with respect to the rotation direction as long as the exhaust process and the intake process through the discharge port 54*a* are not performed. Further, since the cam groove 53*e* is inclined, the reciprocating operation of the pump 56 corresponding to the inclination can be allowed.

(Pressing Member)

Next, the most characteristic pressing member 59 in this example will be described with reference to FIGS. 18B, 21A, 21B, 22A, and 22B.

The pressing member 59 presses the flange seal 57*b*, which is an elastic member, in the axial direction (X direction in FIG. 18A) as the rotation center of the cylindrical portion 52*b*, which is the developer accommodation portion 52, and is provided to be relatively rotatable with respect to the flange seal 57*b*. The pressing member 59 is removably provided at an end portion of the cylindrical portion 52*b*, which is the developer accommodation portion 52, on the flange portion 54 side.

Note that, in this example, the flange seal 57*b*, which is an elastic member, is provided in the developer discharge portion 54*c*, and the pressing member 59 is provided in the developer accommodation portion 52 to face the flange seal 57*b* in the axial direction, but the configuration is not limited thereto. The pressing member 59 may be removably provided in either the developer accommodation portion 52 or the developer discharge portion 54*c*. This will be described below.

As illustrated in FIGS. 18B, 21A, and 21B, the pressing member 59 includes a pressing portion 59*a* that presses the flange seal 57*b*, and the press-fitting portion 59*b* provided to project to the side opposite to the pressing portion 59*a* in the axial direction. The press-fitting portion 59*b* of the pressing member 59 is an annular rib, the engagement portion 52*c* of the cylindrical portion 52*b* is an annular groove, and the press-fitting portion 59*b* and the engagement portion 52*c* are in a press-fitting relationship. That is, the pressing member 59 is configured to be press-fitted into the cylindrical portion 52*b* of the developer accommodation portion 52. Specifically, a rib width h1 (see FIG. 21B) of the press-fitting portion 59*b* in a direction orthogonal to the axial direction is slightly larger than a groove width h2 (see FIG. 22B) of the engagement portion 52*c* (h1>h2).

In addition, the pressing member 59 has the rotation restricting portion 59*c* fitted into the rotation restricting groove 52*d* provided in the cylindrical portion 52*b*. Consequently, the pressing member 59 fitted into the cylindrical portion 52*b* rotates integrally with the cylindrical portion 52*b* by fitting between the rotation restricting groove 52*d* and the rotation restricting portion 59*c*. Therefore, the pressing member 59 is rotatable relative to the flange seal 57*b*. Further, as described above, since the pressing member 59 and the cylindrical portion 52*b* are in a press-fitting relationship, and the pressing member 59 crushes the flange seal 57*b*, the developer interposed in the vicinity does not leak from a gap between the developer discharge portion 54*c* and the developer accommodation portion 52 to the outside of the developer replenishment container 51.

As described above, it is desirable to reuse the developer replenishment container 51 as one measure for reducing the amount of carbon dioxide emission. However, when the developer replenishment container is reused, there is a concern that the pressing member will be damaged by scratches such as a dent or the like in a disassembling or cleaning process, since the collected developer replenishment container is disassembled and cleaned. When the pressing member is damaged, the damaged pressing member damages the elastic member, and there is a concern that the developer will scatter from a damaged portion to the outside of the developer replenishment container in a case where the pressing member rotates relatively with respect to the elastic member.

In this example, the pressing member 59 relatively rotates while crushing the flange seal 57*b* which is the non-rotating portion, and the cylindrical portion 52*b* does not crush the flange seal 57*b*. Therefore, a sliding mark does not occur in the cylindrical portion 52*b*, and even if the cylindrical portion is damaged during disassembly or cleaning, the pressing member 59 crushes the flange seal 57*b*, so that the flange seal 57*b* is not damaged.

As described above, by removing the pressing member 59, which is a separate member, from the cylindrical portion 52*b*, the cylindrical portion 52*b* in which the pressing member 59 is removably provided can be reused even if there is a dent, a scratch, or a sliding mark. Therefore, since the cylindrical portion 52*b* occupies most of the developer replenishment container 51 in terms of the weight ratio, it is possible to greatly contribute to reduction of the amount of carbon dioxide emission and to improve a reuse rate of the components.

Note that, in this example, the flange seal 57*b* is bonded to the flange portion 54 which is a non-rotating portion, and the pressing member 59 is press-fitted into the cylindrical portion 52*b*, so that the flange seal 57*b* is relatively rotated while being crushed. However, the following configuration may be employed. In the configuration, the flange seal 57*b* is bonded to the rotating cylindrical portion 52*b*, and the pressing member 59 is press-fitted into the flange portion 54 which is the non-rotating portion. Also in this configuration, the flange seal 57*b* can be relatively rotated while being crushed. However, when the flange seal 57*b* that has reached the end of service life is discarded, there is a possibility that the flange seal 57*b* will be discarded together with a member bonded to the flange seal with the adhesive 57*c*. In this case, the cylindrical portion 52*b* that occupies most of the weight of the developer replenishment container 51 can contribute more to the reduction of the amount of carbon dioxide emission than the flange portion 54 can. Therefore, it can be described that the configuration described in this example in which the flange seal 57*b* is bonded to the flange portion 54 which is the non-rotating portion and the pressing member 59 is press-fitted into the cylindrical portion 52*b* so that the flange seal 57*b* is relatively rotated while being crushed is a better configuration.

In addition, the pressing member 59 can be made of a hard material. Although there is a concern that the pressing member 59 will be damaged during the disassembly or the cleaning, the damage can be suppressed by using a hard material (a material such as metal), and the work of attaching and detaching the pressing member 59 to and from the cylindrical portion 52*b* can be eliminated. Note that, although the cylindrical portion 52*b* and the pressing member 59 can be integrated and molded with a hard material, the cost and the weight of the developer replenishment container 51 may increase, if the cylindrical portion 52*b*, which occupies most of the developer replenishment container 51 in terms of the weight ratio, is molded with the hard material. When the weight increases, operability of the developer replenishment container 51 which is replaced by a user decreases. Therefore, it is desirable that only the pressing member 59 is made of a hard material.

Specifically, it is more desirable to make the pressing member 59 of a harder material than the cylindrical portion 52*b* (or the developer discharge portion) which is the developer accommodation portion 52. More specifically, it is desirable that the pressing member 59 has a higher hardness (that is, harder) than the cylindrical portion 52*b* (or the developer discharge portion) which is the developer accommodation portion 52. Consequently, it is possible to suppress the damage of the pressing member 59 and to eliminate the work of attaching and detaching the pressing member 59 to and from the cylindrical portion 52*b*.

Figure 23A:
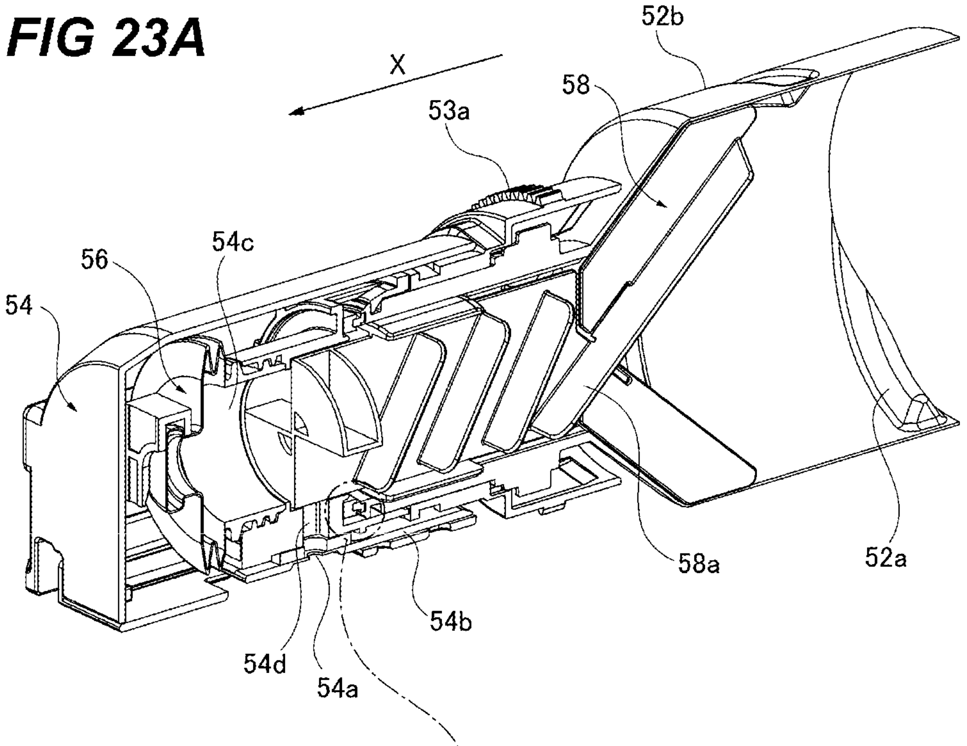
FIG. 23A is a partial cross-sectional perspective view of the developer replenishment container.
Figure 23B:
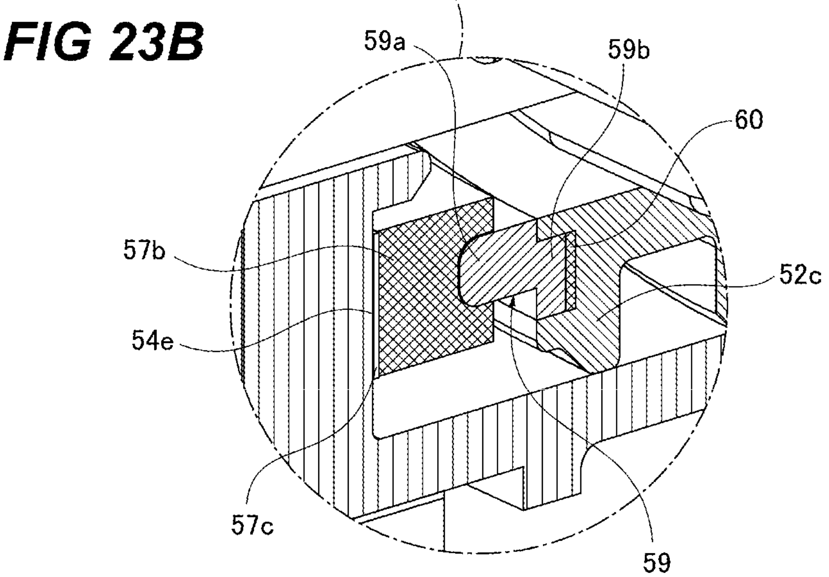
FIG. 23B is an enlarged cross-sectional perspective view around a pressing member and a gap sealing member in Example 4.

Next, although the press-fitting portion 59*b* of the pressing member 59 and the engagement portion 52*c* of the cylindrical portion 52*b* are in the press-fitting relationship, a gap is formed between the press-fitting portion 59*b* and the engagement portion 52*c*, and thus there is a concern that the developer may leak, in a case where a very large amount of distribution of goods is applied when the developer replenishment container 51 is transported to a user address. Therefore, as illustrated in FIGS. 23A and 23B, it is desirable to provide a gap sealing member 60 which is an elastic member between the pressing member 59 and the developer accommodation portion 52 in which the pressing member 59 is removably provided. FIG. 23A is a partial cross-sectional perspective view of the developer replenishment container 51, and FIG. 23B is an enlarged cross-sectional perspective view around the pressing member 59 and a gap sealing member 60 in this example.

Although there is a concern that the press-fitting portion will be loosened due to a large amount of distribution of goods, and a gap may be generated between the press-fitting portion 59*b* and the engagement portion 52*c*, the gap sealing member 60 is provided to fill the gap between the press-fitting portion 59*b* and the engagement portion 52*c* in this example, as illustrated in FIG. 23B. Therefore, the developer does not leak out of the developer replenishment container 51 from a gap between the press-fitting portion 59*b* and the engagement portion 52*c* even with the large amount of distribution of goods. Note that, since the gap sealing member 60 does not relatively rotate between the cylindrical portion 52*b* and the pressing member 59, the gap sealing member 60 is merely sandwiched between the press-fitting portion 59*b* and the engagement portion 52*c* and does not need to be fixed with a double-sided tape or the like.

Figure 24A:
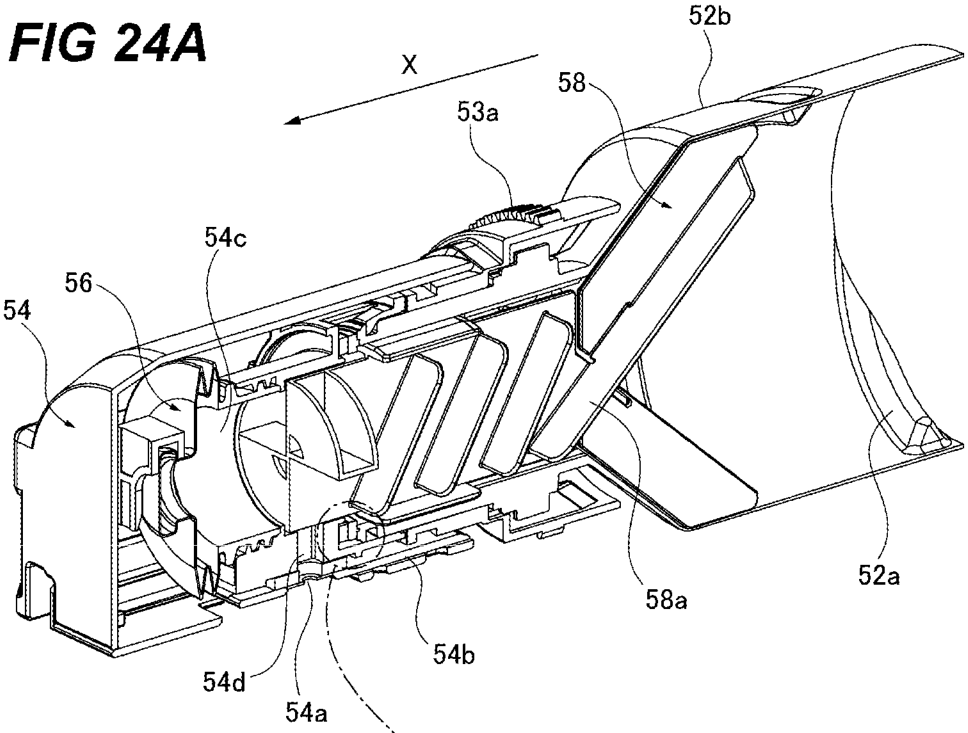
FIG. 24A is a partial cross-sectional perspective view of a developer replenishment container.
Figure 24B:
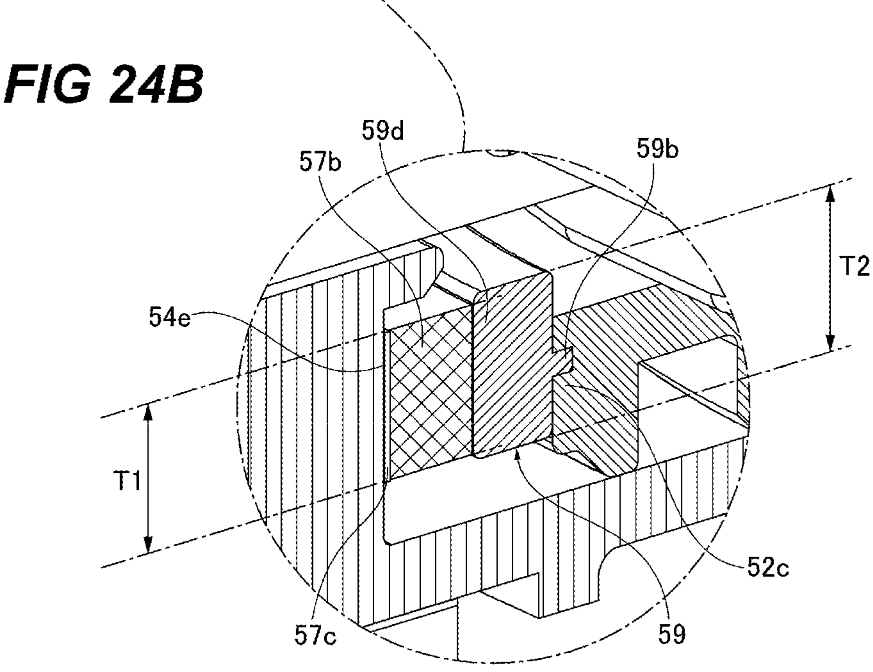
FIG. 24B is an enlarged cross-sectional perspective view around an entire-surface pressing portion in Example 4.

In addition, although the pressing portion 59*a* of the pressing member 59 crushes the flange seal 57*b*, a shape of the pressing portion 59*a* may be the shape illustrated in FIGS. 24A and 24B. FIG. 24A is a partial cross-sectional perspective view of the developer replenishment container 51, and FIG. 24B is an enlarged cross-sectional perspective view around an entire-surface pressing portion 59*d* in this example. As illustrated in FIG. 24B, the pressing member 59 has the entire-surface pressing portion 59*d* having a shape for crushing the entire surface of the flange seal 57*b* facing the pressing member 59. That is, a width T2 of the entire-surface pressing portion 59*d* has a relationship of $T1 \leq T2$ with respect to a width T1 of the flange seal 57*b*, and the width T1 completely overlaps the width T2 when projected in the X direction.

Figure 25:
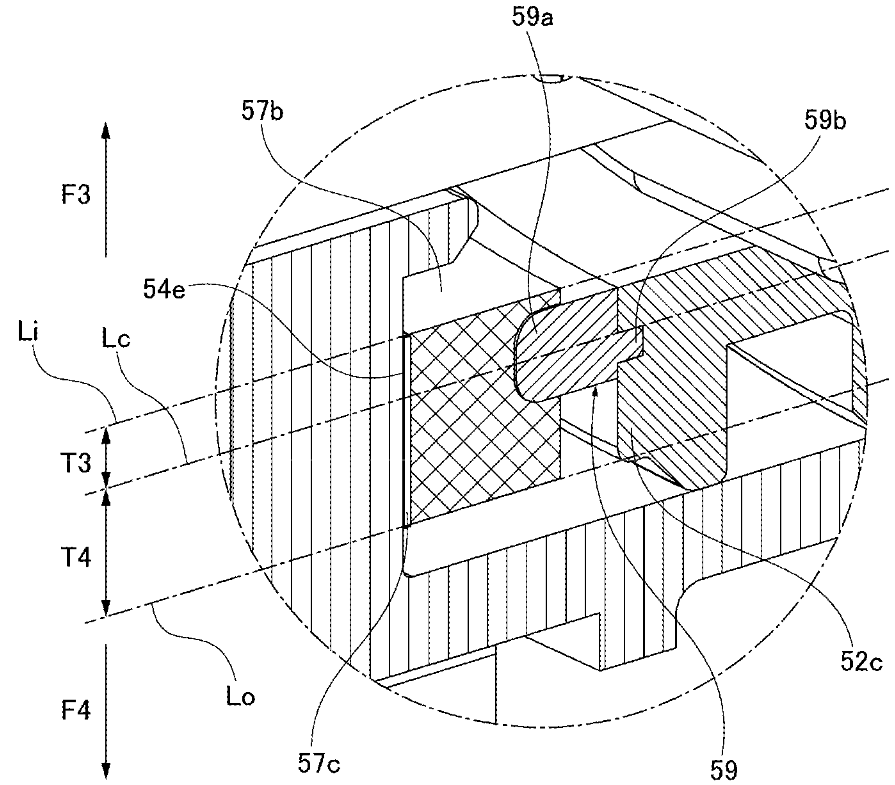
FIG. 25 is an enlarged cross-sectional perspective view around the pressing member when a flange seal is shifted and bonded.

Here, a state in which the pressing member 59 crushes a part of the flange seal 57*b* as illustrated in FIG. 25 will be described in comparison with a state in which the pressing member 59 crushes the entire surface of the flange seal 57*b* as illustrated in FIGS. 24A and 24B. FIG. 25 is an enlarged perspective view around the pressing member 59 when the flange seal 57*b* illustrated in FIG. 18B is bonded to be shifted in an F4 direction from the pressing member 59. As illustrated in FIG. 25, the flange seal 57*b* is bonded to the cylindrical portion 52*b* to be shifted to one side in the direction orthogonal to the axial direction, and thus widths T3 and T4 from a center Lc of the pressing portion 59*a* to both end surfaces (an inner circumferential surface Li, an outer circumferential surface Lo) are different from each other. Specifically, since the flange seal 57*b* is shifted in the F4 direction with respect to the pressing member 59, a relationship between the width T3 from the center Lc of the pressing portion 59*a* to the inner circumferential surface Li of the flange seal 57*b* and the width T4 from the center Lc of the pressing portion 59*a* to the outer circumferential surface Lo of the flange seal 57*b* is established as T3<T4. At this time, since different repulsive forces of the flange seal 57*b* are generated between the width T3 side and the width T4 side, and the repulsive force on the width T4 side is higher than that on the width T3 side, the flange seal 57*b* receives a sliding force in the F4 direction. That is, since the flange seal 57*b* is bonded to the flange portion 54 which is the non-rotating portion with the adhesive 57*c*, an adhesive force of the adhesive 57*c* needs to be higher than the sliding force by which the flange seal 57*b* is shifted. Therefore, in the configuration in which the pressing member 59 crushes a part of the flange seal 57*b* as illustrated in FIG. 25, the adhesive 57*c* having a higher adhesive force than that in the configuration in which the entire flange seal 57*b* is crushed is used, so that adhesive residues and the like are likely to be produced when the flange seal 57*b* is peeled off by reuse. Therefore, as illustrated in FIG. 24, when the pressing member 59 has a shape to crush the entire surface of the flange seal 57*b*, the adhesive force of the adhesive 57*c* can be reduced as compared with the configuration in which a part of the flange seal is crushed, and adhesive residues can be reduced. Therefore, it can be described that the configuration in which the entire-surface pressing portion 59*d* crushes the entire surface of the flange seal 57*b* is the better configuration.

OTHER EXAMPLES (Projecting Amount (i.e., Projecting Distance) of Outer Projecting Ring, Projecting Rib, and Inner Projecting Ring from Container Lip Portion)

Note that the outer projecting ring 101*d*, the projecting rib 101*e*, and the inner projecting ring 101*f* described in Examples 1 to 3 project from the container lip portion 101*c* in the rotation axis direction (direction of the axis P) of the developer container 101; however, as a projecting amount g increases, the container lip portion 101*c* can be effectively protected. On the other hand, when the projecting amount g is large, there is a possibility that projecting portions will interfere with the container frame 103 or the like.

From the above viewpoint, the projecting amount g of the outer projecting ring 101*d*, the projecting rib 101*e*, and the inner projecting ring 101*f* from the container lip portion 101*c* is appropriately smaller than a thickness h of the container seal 105 (g<h). For example, when the thickness h of the container seal 105 is 3 to 4 mm, the projecting amount g is appropriately 1 to 3 mm. With such a relationship, the outer projecting ring 101*d*, the projecting rib 101*e*, and the inner projecting ring 101*f* do not interfere with the container frame 103, and a risk of breakage of the container lip portion 101*c* can be effectively reduced.

(Combination of Protective Configurations of Container Lip Portion)

In addition, the protective configurations of the container lip portion 101*c* described in Examples 1 to 3 can also be implemented in combination. For example, the protective configuration 1 and the protective configuration 3 can be combined, and the protective configuration 2 and the protective configuration 3 can be combined. At that time, the effects of the respective protective configurations are exerted in combination. For example, when the protective configuration 1 and the protective configuration 3 are combined, the risk of damage to the container lip portion 101*c* can be effectively reduced against collision with the disassembling device, the cleaning device, the moving device, the storage device, and the assembling device from the outer circumferential side or the inner circumferential side, as indicated by the arrows in FIGS. 9A to 9C and 11A to 11C.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-205310, filed Dec. 22, 2022, No. 2022-208319, filed Dec. 26, 2022, which is hereby incorporated by reference herein in its entirety.

What is claimed is:

1. A developer replenishment container configured to be detachably attachable to a developer replenishment device and replenish a developer through a replenishment port, the developer replenishment container comprising:

a developer replenishment portion configured to have the replenishment port and be restricted not to rotate by being attached to the developer replenishment device;

a developer accommodation portion configured to be provided to be relatively rotatable with respect to the developer replenishment portion and accommodate a developer; and an annular seal member configured to be provided at a connection portion between the developer replenishment portion and the developer accommodation portion and seal a gap between the developer replenishment portion and the developer accommodation portion, wherein the developer accommodation portion has an annular abutment portion provided at an end portion on a developer replenishment portion side in a direction of an axis which is a rotation center of the developer accommodation portion and provided to be in contact with the seal member in the direction of the axis; and a projecting portion provided near the abutment portion and provided to project toward the developer replenishment portion further than the abutment portion in the direction of the axis, wherein the projecting portion is provided to be divided into a plurality of portions along a circumferential direction of the abutment portion.

2. The developer replenishment container according to claim 1, wherein the projecting portion is provided to be continuous all along a circumference of the abutment portion in a circumferential direction.

3. The developer replenishment container according to claim 1, wherein the projecting portion is annularly provided in a circumferential direction along the abutment portion.

4. The developer replenishment container according to claim 1, wherein the projecting portion is provided on an inner circumferential side of the abutment portion.

5. The developer replenishment container according to claim 1, wherein the projecting portion is provided on an outer circumferential side of the abutment portion.

6. The developer replenishment container according to claim 1, wherein the projecting portion has a projecting distance from the abutment portion which is smaller than a thickness of the seal member.

7. A developer replenishment container configured to be detachably attachable to a developer replenishment device and replenish a developer through a replenishment port, the developer replenishment container comprising:

a developer replenishment portion configured to have the replenishment port and be restricted not to rotate by being attached to the developer replenishment device;

a developer accommodation portion configured to be provided to be relatively rotatable with respect to the developer replenishment portion and accommodate a developer; and an annular seal member configured to be provided at a connection portion between the developer replenishment portion and the developer accommodation portion and seal a gap between the developer replenishment portion and the developer accommodation portion, wherein the developer accommodation portion has an annular abutment portion provided at an end portion on a developer replenishment portion side in a direction of an axis which is a rotation center of the developer accommodation portion and provided to be in contact with the seal member in the direction of the axis; and a projecting portion provided near the abutment portion and provided to project toward the developer replenishment portion further than the abutment portion in the direction of the axis, wherein the projecting portion has a projecting distance from the abutment portion which is smaller than a thickness of the seal member.

* * * * *